(12) United States Patent
Park et al.

(10) Patent No.: US 11,356,744 B2
(45) Date of Patent: Jun. 7, 2022

(54) DISPLAY DEVICE AND OPERATION METHOD THEREOF

(71) Applicant: SAMSUNG ELECTRONICS CO., LTD., Suwon-si (KR)

(72) Inventors: Gi Hoon Park, Suwon-si (KR); Ja Yoon Koo, Suwon-si (KR); Jae Ook Kwon, Suwon-si (KR); Jeung Hyung Park, Suwon-si (KR); Chang Kun Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/761,897

(22) PCT Filed: Oct. 31, 2018

(86) PCT No.: PCT/KR2018/013099
§ 371 (c)(1),
(2) Date: May 6, 2020

(87) PCT Pub. No.: WO2019/088692
PCT Pub. Date: May 9, 2019

(65) Prior Publication Data
US 2021/0235167 A1 Jul. 29, 2021

(30) Foreign Application Priority Data
Nov. 6, 2017 (KR) .................. 10-2017-0146693

(51) Int. Cl.
*H04N 21/81* (2011.01)
*G06N 3/02* (2006.01)
(Continued)

(52) U.S. Cl.
CPC ............. *H04N 21/812* (2013.01); *G06N 3/02* (2013.01); *G06Q 30/0255* (2013.01);
(Continued)

(58) Field of Classification Search
CPC ........... H04N 21/251; H04N 21/25891; H04N 21/26241; H04N 21/4312; H04N 21/4314;
(Continued)

(56) References Cited

U.S. PATENT DOCUMENTS 8,494,984 B2  7/2013  Ito et al.
9,432,739 B2  8/2016  Kim et al.
(Continued)

FOREIGN PATENT DOCUMENTS

GB   2519375 A       4/2015
JP   2011-118765 A   6/2011
(Continued)

OTHER PUBLICATIONS

Communication dated Jun. 18, 2020 issued by the European Patent Office in application No. 18873656.5.
(Continued)

*Primary Examiner* — Nnenna N Ekpo
(74) *Attorney, Agent, or Firm* — Sughrue Mion, PLLC

(57) ABSTRACT

According to an embodiment, an image display device includes: a display; a memory storing one or more instructions; and a processor executing the one or more instructions stored in the memory, wherein the processor executes the one or more instructions: to determine whether it is a recommended time for outputting advertisement content, from a user's log data, based on a first trained model using one or more neural networks; to determine a recommended attribute of an advertisement display region from the user's log data, based on a second trained model using the one or more neural networks, when it is determined that it is the recommended time for outputting the advertisement content; and to adjust an attribute of the advertisement display region based on the determined recommended attribute and control (Continued)

the display to output the advertisement content in the attribute-adjusted advertisement display region.

14 Claims, 16 Drawing Sheets

(51) Int. Cl.
    *G06Q 30/02*     (2012.01)
    *H04N 21/431*     (2011.01)

(52) U.S. Cl.
    CPC ..... *G06Q 30/0264* (2013.01); *G06Q 30/0271* (2013.01); *H04N 21/4316* (2013.01)

(58) Field of Classification Search
    CPC ......... H04N 21/4316; H04N 21/44213; H04N 21/44222; H04N 21/45; H04N 21/4532; H04N 21/458; H04N 21/466; H04N 21/4662; H04N 21/4666; H04N 21/4668; H04N 21/4858; H04N 21/812; H04N 21/8173
    See application file for complete search history.

(56) References Cited

U.S. PATENT DOCUMENTS

| | | | |
|---|---|---|---|
| 10,231,030 B1* | 3/2019 | Price | H04N 21/812 |
| 2009/0228914 A1 | 9/2009 | Wong et al. | |
| 2010/0180300 A1* | 7/2010 | Carpenter | H04N 21/4828 725/40 |
| 2010/0223638 A1* | 9/2010 | Hubbard | H04N 21/812 725/9 |
| 2011/0040612 A1 | 2/2011 | Simmons et al. | |
| 2011/0137835 A1 | 6/2011 | Ito et al. | |
| 2011/0264519 A1* | 10/2011 | Chan | G06Q 30/0251 705/14.49 |
| 2014/0310108 A1 | 10/2014 | Ryu et al. | |
| 2016/0331279 A1 | 11/2016 | Shpin et al. | |

FOREIGN PATENT DOCUMENTS

| | | |
|---|---|---|
| JP | 5344617 B2 | 11/2013 |
| KR | 10-1003045 B1 | 12/2010 |
| KR | 10-2012-0136591 A | 12/2012 |
| KR | 10-1274740 B1 | 6/2013 |
| KR | 10-2014-0046902 A | 4/2014 |
| KR | 10-1507494 B1 | 3/2015 |
| KR | 10-1646217 B1 | 8/2016 |
| KR | 10-2017-0033071 A | 3/2017 |

OTHER PUBLICATIONS

Search Report and Written Opinion (PCT/ISA/210 & PCT/ISA/237) dated Mar. 4, 2019, issued by the International Searching Authority in counterpart International Patent Application No. PCT/KR2018/013099.

Communication dated Aug. 9, 2021 issued by the Korean Patent Office in Counterpart Korean Application No. 10-2017-0146693.

* cited by examiner

DISPLAY DEVICE AND OPERATION METHOD THEREOF

TECHNICAL FIELD

Various embodiments described herein relate to image display devices and operation methods thereof, and more particularly, to a method by which an image display device outputs (displays) advertisement content.

BACKGROUND ART

With advertisement content in the related art, advertisements predetermined by broadcasters are output in batches. However, with the development of the Internet, a system for outputting advertisements in different forms for respective users in consideration of users' situations instead of outputting advertisements predetermined by broadcasters has been introduced. In the case of outputting advertisements in consideration of users' situations, because it is important to determine users' situations, a method for outputting advertisements by more accurately targeting users is required.

Particularly, with the development of artificial intelligence (AI) technology, a method of outputting advertisements by collecting and analyzing various contexts about users' situations to target users based on AI technology has been researched.

An AI system is a computer system that implements human-level intelligence, and unlike an existing rule-based smart system, the AI system allows a machine to learn, determine, and become more intelligent by itself. Because an AI system may have a higher recognition rate and more accurately understand a user's tastes as it is used more, existing rule-based smart systems have been gradually replaced with deep learning-based AI systems.

AI technology includes machine learning (deep learning) and elementary technologies utilizing machine learning. Machine learning is an algorithm technology for classifying/learning the characteristics of input data by itself, and the elementary technologies are technologies for simulating functions of the human brain such as recognition and determination by using a machine learning algorithm such as deep learning, and may include technical fields such as linguistic understanding, visual understanding, reasoning/prediction, knowledge expression, and motion control.

Various fields in which AI technology is applied are as follows. Linguistic understanding is a technology for recognizing and applying/processing human languages/characters and may include natural language processing, machine translation, conversation systems, question and answer, and voice recognition/synthesis. Visual understanding is a technology for recognizing and processing objects like human vision and may include object recognition, object tracking, image search, human recognition, scene understanding, space understanding, and image improvement. Reasoning/prediction is a technology for reasoning and predicting logically by determining information and may include knowledge/probability-based reasoning, optimization prediction, preference-based planning, and recommendation. Knowledge expression is a technology for automatically processing human experience information into knowledge data and may include knowledge construction (data generation/classification) and knowledge management (data utilization). Motion control is a technology for controlling autonomous driving of a vehicle and motion of a robot and may include motion control (navigation, collision, and driving) and operation control (behavior control).

DESCRIPTION OF EMBODIMENTS

Technical Problem

Various embodiments described herein are to provide advertisement content more effectively by adjusting an attribute of an advertisement display region in consideration of the preference of a user viewing the advertisement content and outputting the advertisement content in the attribute-adjusted advertisement display region.

Various embodiments described herein are to determine a suitable time for outputting advertisement content and an attribute of an advertisement display region preferred by a user in consideration of the user's situation and output the advertisement content in the advertisement display region based on the determined result.

Solution to Problem

According to an embodiment, an image display device includes: a display; a memory storing one or more instructions; and a processor executing the one or more instructions stored in the memory, wherein the processor executes the one or more instructions: to determine whether it is a recommended time for outputting advertisement content, from a user's log data, based on a first trained model using one or more neural networks; to determine a recommended attribute of an advertisement display region from the user's log data, based on a second trained model using the one or more neural networks, when it is determined that it is the recommended time for outputting the advertisement content; and to adjust an attribute of the advertisement display region based on the determined recommended attribute and control the display to output the advertisement content in the attribute-adjusted advertisement display region.

BEST MODE

Figure 1:
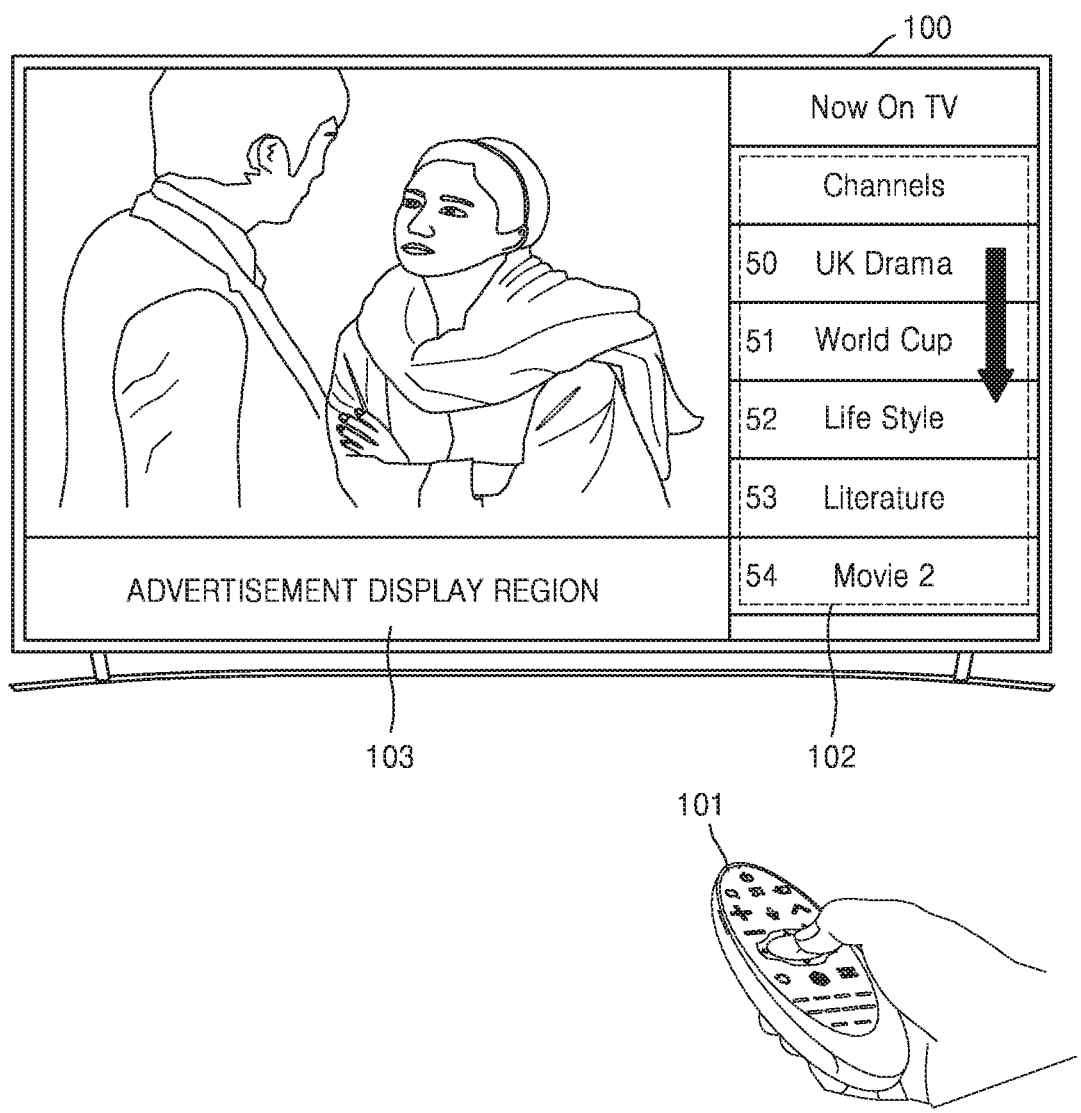
FIG. 1 is a diagram illustrating an example in which an image display device outputs advertisement content, according to an embodiment.

According to an embodiment, an image display device includes: a display; a memory storing one or more instructions; and a processor executing the one or more instructions stored in the memory, wherein the processor executes the one or more instructions: to determine whether it is a recommended time for outputting advertisement content, from a user's log data, based on a first trained model using one or more neural networks; to determine a recommended attribute of an advertisement display region from the user's log data, based on a second trained model using the one or more neural networks, when it is determined that it is the recommended time for outputting the advertisement content; and to adjust an attribute of the advertisement display region based on the determined recommended attribute and control the display to output the advertisement content in the attribute-adjusted advertisement display region.

According to an embodiment, the attribute of the advertisement display region may include at least one of a position, size, or form of the advertisement display region and a form of the advertisement content output in the advertisement display region.

According to an embodiment, the user's log data may include at least one of viewing history information, the user's reaction information about the advertisement display region, and application use information.

According to an embodiment, the viewing history information may include at least one of channels viewed by the user, program names, viewing times, information indicating occurrence of a channel zapping event, and information indicating occurrence of an event related to an electronic program guide (EPG), the user's reaction information about the advertisement display region may include at least one of whether the advertisement content output in the advertisement display region has been viewed, a proportion of a viewed portion in the advertisement content, and information indicating whether an external input for selecting the advertisement display region has been received, and the application use information may include at least one of a name of an application used, an application use time, a category of an application used, and an application use frequency.

According to an embodiment, the processor may execute the one or more instructions to determine whether it is the recommended time for outputting the advertisement content, in response to a user input generating one of a channel zapping event, an EPG search event, and an application execution event.

According to an embodiment, the first trained model may be determined by learning a correlation between the user's log data and the recommended time for outputting the advertisement content, in response to input of the user's log data to the one or more neural networks, and the second trained model may be determined by learning a correlation between the user's log data and the recommended attribute of the advertisement display region in response to input of the user's log data to the one or more neural networks.

According to an embodiment, the processor may execute the one or more instructions to stop outputting the advertisement content when it is determined that it is not the recommended time for outputting the advertisement content.

According to an embodiment, the processor may execute the one or more instructions to deactivate the advertisement display region when it is determined that it is not the recommended time for outputting the advertisement content.

According to an embodiment, the recommended time for outputting the advertisement content may be determined differently according to a user's concentration on broadcast content that is being output through the display.

According to an embodiment, the processor may execute the one or more instructions: to generate, in response to a user input generating an event about the image display device, log data corresponding to the generated event; and to update at least one of the first trained model and the second trained model when the generated log data is input to the one or more neural networks.

According to an embodiment, an image display method includes: determining whether it is a recommended time for outputting advertisement content, from a user's log data, based on a first trained model using one or more neural networks; determining a recommended attribute of an advertisement display region from the user's log data, based on a second trained model using the one or more neural networks, when it is determined that it is the recommended time for outputting the advertisement content; and adjusting an attribute of the advertisement display region based on the determined recommended attribute and outputting the advertisement content in the attribute-adjusted advertisement display region.

MODE OF DISCLOSURE

Hereinafter, embodiments of the present disclosure will be described in detail with reference to the accompanying drawings so that those of ordinary skill in the art may easily implement the embodiments. However, the present disclosure may be embodied in many different forms and should not be construed as being limited to the embodiments set forth herein. Also, portions irrelevant to the description of the present disclosure will be omitted in the drawings for a clear description of the present disclosure, and like reference numerals will denote like elements throughout the specification.

The terms used herein are those general terms currently widely used in the art in consideration of functions in regard to the present disclosure, but the terms may mean various other terms according to the intentions of those of ordinary skill in the art, precedents, or new technology in the art. Thus, the terms used herein should not be interpreted only by the names of the terms but should be interpreted based on the meanings of the terms and the contents throughout the present disclosure.

Also, the terms used herein are only used to describe particular embodiments and are not intended to limit the present disclosure. As used herein, the singular forms "a", "an", and "the" are intended to include the plural forms as well, unless the context clearly indicates otherwise. Also, throughout the specification, when an element is referred to as being "connected" to another element, it may be "directly connected" to the other element or may be "electrically connected" to the other element with one or more intervening elements therebetween. Also, when something is referred to as "including" a component, another component may be further included unless specified otherwise.

As used herein particularly in the claims, "the" or the like may refer to both the singular and the plural. Also, when there is no description explicitly specifying the order of operations described in a method according to the present disclosure, the described operations may be performed in a suitable order. The scope of the present disclosure is not limited to the described operation order.

The phrases "in some embodiments" or "in an embodiment" appearing in various places in the specification may not necessarily all refer to the same embodiment.

Some embodiments of the present disclosure may be represented in terms of functional block components and various processing operations. Some or all of these functional blocks may be implemented by any number of hardware and/or software components that execute particular functions. For example, the functional blocks of the present disclosure may be implemented by one or more microprocessors or may be implemented by circuit components for a certain function. Also, for example, the functional blocks of the present disclosure may be implemented in various programming or scripting languages. The functional blocks may be implemented by an algorithm that is executed in one or more processors. Also, the present disclosure may employ the related art for electronic environment setting, signal processing, and/or data processing. Terms such as "mechanism," "element," "unit," and "configuration" may be used in a broad sense and are not limited to mechanical and physical configurations.

Also, connection members or connection lines between elements illustrated in the drawings merely represent examples of functional connections and/or physical or logical connections. In actual apparatuses, the connection between elements may be represented by various alternative or additional functional connections, physical connections, or logical connections.

Hereinafter, the present disclosure will be described in detail with reference to the accompanying drawings.

FIG. 1 is a diagram illustrating an example in which an image display device outputs (displays) advertisement content, according to an embodiment.

Referring to FIG. 1, an image display device 100 may be, but is not limited to, a television (TV) and may be implemented as an electronic device including a display. For example, the image display device 100 may be implemented as various electronic devices such as portable phones, tablet personal computers (PCs), digital cameras, camcorders, notebook computers (laptop computers), desktops, e-book terminals, digital broadcast terminals, personal digital assistants (PDAs), portable multimedia players (PMPs), navigation devices, MP3 players, and wearable devices. Also, the image display device 100 may be a fixed type or a mobile type and may be a digital broadcasting receiver capable of receiving digital broadcasting.

The image display device 100 may be implemented not only as a flat display device but also as a curved display device having a screen with curvature or a flexible display device having adjustable curvature. The output resolution of the image display device 100 may include, for example, High Definition (HD), Full HD, Ultra HD, or resolution higher than Ultra HD.

The image display device 100 may be controlled by a control device 101, and the control device 101 may be implemented as various types of devices for controlling the image display device 100, such as a remote controllers or mobile phones. Alternatively, when a display of the image display device 100 is implemented as a touch screen, the control device 101 may be replaced with a user's finger, an input pen, or the like.

Also, the control device 101 may control the image display device 100 by using near field communication including Infrared or Bluetooth. The control device 101 may control the function of the image display device 100 by using at least one of provided keys (including buttons), a touch pad, a microphone capable of receiving a user's voice (not illustrated), and a sensor capable of recognizing the motion of the control device 101 (not illustrated).

The control device 101 may include a turn-on/off button for turning on or off the power of the image display device 100. Also, the control device 101 may change the channel of the image display device 100, adjust the volume, select terrestrial broadcasting/cable broadcasting/satellite broadcasting, or set the environment according to a user input.

Also, the control device 101 may be a pointing device. For example, the control device 101 may operate as a pointing device when receiving a particular key input.

As used herein, the term "user" may refer to a person controlling the function or operation of the image display device 100 by using the control device 101 and may include a viewer, a manager, or an installer.

According to an embodiment, the image display device 100 may display advertisement content in an advertisement display region 103 including a partial region of the display.

The advertisement display region 103 may be a region in which advertisement content is output on the display of the image display device 100 and may be referred to as an advertisement inventory according to an embodiment. For example, as illustrated in FIG. 1, the advertisement display region 103 may include a partial region located at the bottom of the display. Also, the position, size, and form of the advertisement display region 103 may vary according to embodiments. For example, the advertisement display region 103 may include a partial region located on at least one of the top, bottom, left, and right sides of the display, and the form of the advertisement display region 103 may include, but is not limited to, a form of being fixed at a particular position on the display, a form in which a pop-up window moves, or a form in which the transparency is set. Also, according to an embodiment, the image display device 100 may output different forms of advertisement content in the advertisement display region 103. For example, the advertisement content output in the advertisement display region 103 may include at least one of a video form, a still image form, an animation form, and a text form and may vary according to embodiments.

As for the attributes of the advertisement display region 103 including the location, size, or form of the advertisement display region 103 and the form of advertisement content output in the advertisement display region 103, the preferred attributes thereof may vary according to users. For example, a user who frequently views video content may prefer advertisement content in a video form, and advertisement content in a text form may be preferred according to the age of a user. Thus, according to an embodiment, the image display device 100 may provide advertisement content more effectively by adjusting the attribute of an advertisement display region in consideration of the preference of a user viewing the advertisement content and outputting the advertisement content in the attribute-adjusted advertisement display region.

Also, when the advertisement content is output in the advertisement display region 103 while the user is concentrating on viewing broadcast content output through the image display device 100, it may interfere with the user's immersion in the broadcast content and the user may have a negative perception of the output advertisement content. On the other hand, when the advertisement content is output in the advertisement display region 103 while the user is not concentrating on the currently-output broadcast content, the user may be more interested in the output advertisement content. For example, the user may be in a state of searching for another channel by using a channel list 102 displayed on the display of the image display device 100. In this case, the user may be in a state of not concentrating on the currently-output broadcast content and may be more interested in the advertisement content output in the advertisement display region 103.

Accordingly, in order to improve the advertisement effect without interfering with the user viewing the broadcast content, there may be a need for a method of determining a suitable time for outputting advertisement content and an attribute of an advertisement display region preferred by the user, in consideration of the user's situation, and outputting the advertisement content in the advertisement display region based on the determination result.

Figure 2:
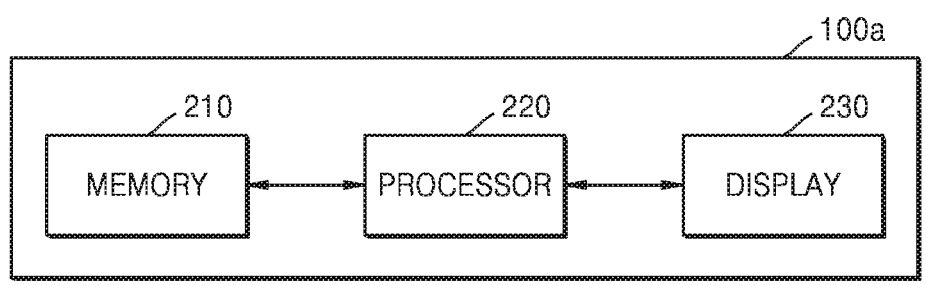
FIG. 2 is a block diagram illustrating a configuration of an image display device according to an embodiment.

FIG. 2 is a block diagram illustrating a configuration of an image display device according to an embodiment.

An image display device 100a illustrated in FIG. 2 may be an embodiment of the image display device 100 illustrated in FIG. 1. Referring to FIG. 2, the image display device 100a according to an embodiment may include a memory 210, a processor 220, and a display 230. However, the image display device 100a may be implemented by more components than the illustrated components and is not limited to the above example.

The above components will be described below in sequence.

According to an embodiment, the memory 210 may store one or more programs for processing and controlling the operations of the processor 220 and may store data that is input to the image display device 100a or output from the image display device 100a.

The memory 210 may include at least one type of storage medium from among flash memory type, hard disk type, multimedia card micro type, card type memory (e.g., SD or XD memory), random-access memory (RAM), static random-access memory (SRAM), read-only memory (ROM), electronically erasable programmable read-only memory (EEPROM), programmable read-only memory (PROM), magnetic memory, magnetic disk, and optical disk.

According to an embodiment, the memory 210 may include a module including one or more instructions for determining whether it is a recommended time for outputting advertisement content, from a user's log data, based on a first trained model using one or more neural networks; determining a recommended attribute of an advertisement display region from the user's log data, based on a second trained model using the one or more neural networks, when it is determined that it is the recommended time for outputting the advertisement content; and adjusting an attribute of the advertisement display region based on the determined recommended attribute and outputting the advertisement content in the attribute-adjusted advertisement display region.

According to an embodiment, the memory 210 may store log data of the user who uses the image display device 100a.

The user's log data may include at least one of the user's viewing history information, the user's reaction information about the advertisement display region, and application use information but is not limited thereto. The user's viewing history information may include, for example, at least one of channels viewed by the user through the image display device 100, program names, viewing times, information indicating whether a channel zapping event has occurred, and information indicating whether an electronic program guide (EPG) has been entered. The user's reaction information about the advertisement display region 103 may include, but is not limited to, at least one of information indicating whether the user has viewed the advertisement content output in the advertisement display region 103 from start to end, information indicating whether the user has deactivated the advertisement display region 103 in which the advertisement content is output, a proportion of the user viewing time in the total play time of the advertisement content, and information indicating whether the user has selected the advertisement content to check the detailed information of the advertisement content.

Also, the application use information may include, but is not limited to, at least one of the name of an application used among a plurality of applications that may be executed through the image display device 100a, the application use time, and the application use frequency. The user's log data including at least one of the viewing history information, the user's reaction information about the advertisement display region, and the application use information may be stored, and the stored user's log data may be used to determine the recommended time for outputting the advertisement content and the recommended attributes of the advertisement display region.

The processor 220 may control an overall operation of the image display device 100a. For example, by executing one or more instructions stored in the memory 210, the processor 220 may control the display 230 and perform the function of the image display device 100a described in FIGS. 1 to 14.

According to an embodiment, the processor 220 may determine whether it is a recommended time for outputting advertisement content, from a user's log data, based on a first trained model using one or more neural networks.

The recommended time for outputting the advertisement content may be the time when the user may be interested in the output advertisement content. For example, when the advertisement content is output while the user is concentrating on viewing the currently-output broadcast content, the user may be prevented from viewing the broadcast content. However, when the advertisement content is output while the user is not concentrating on the currently-output broadcast content, the user may be more interested in the output advertisement content. Thus, the recommended time for outputting the advertisement content may be, but is not limited to, the time when the user does not concentrate relatively on the currently-output broadcast content, the time when the user may be interested in the advertisement content, and the time when a relatively high advertisement effect may be expected.

The neural network may include a set of algorithms for learning a method of determining whether it is a time for outputting advertisement content, from a user's log data input to the neural network, based on artificial intelligence. For example, the neural network may learn a method of determining whether it is a recommended time for outputting advertisement content, from a user's log data, based on supervised learning using log data of a certain user as an input value. Also, by learning the type of data necessary to determine whether it is a recommended time for outputting advertisement content from a user's log data without particular supervision by itself, the neural network may learn a method of determining whether it is a time for outputting advertisement content, from a user's log data, based on unsupervised learning for finding a pattern for determining whether it is a recommended time for outputting advertisement content. Also, for example, the neural network may learn a method of determining whether it is a recommended time for outputting advertisement content, from a user's log data, by using reinforcement learning using feedback on whether the result of determining whether it is a recommended time for outputting advertisement content according to learning is correct.

For example, when a channel zapping event for changing the channel has occurred, whether it is a recommended time for outputting advertisement content may be determined differently based on user's log data. For example, when the currently-output broadcast content is a soccer game, a user frequently viewing soccer games may have a higher concentration on the soccer game than a user frequently viewing dramas. Thus, even when a user frequently viewing soccer games generates a channel zapping event while viewing a soccer game, the processor 220 may determine that it is not a recommended time for outputting advertisement content. However, when a user frequently viewing dramas generates a channel zapping event while viewing a soccer game, the processor 220 may determine that the user is not concentrating on viewing the soccer game and determine that it is a recommended time for outputting advertisement content.

The result of determining whether it is the recommended time for outputting the advertisement content based on the first trained model may be in the form of, for example, "YES" or "NO" or may be in the form of dividing the recommendation degree thereof into a plurality of levels and mapping a certain value to each of the levels. For example, the recommendation degree may be represented in the form of a percentage, and the higher recommendation degree may be mapped to the greater value.

According to an embodiment, when it is determined that it is a recommended time for outputting advertisement content, the processor 220 may determine a recommended attribute of an advertisement display region from a user's log data, based on a second trained model using one or more neural networks.

As described above, the attribute of the advertisement display region may include at least one of the position, size, or form of the advertisement display region and the form of the advertisement content output in the advertisement display region.

According to an embodiment, the processor 220 may determine the attribute of the advertisement display region preferred by the user, from the user's log data.

The second trained model may be determined by learning the correlation between the user's log data and the recommended attribute of the advertisement display region in response to the input of the user's log data to one or more neural networks. For example, the second trained model may determine the attribute of the advertisement display region to which the user has reacted, based on the input user's log data. For example, when the advertisement content is output in the advertisement display region in the form of a pop-up window, the number of times the user selects the advertisement content to check the detailed information thereof may be more than or equal to a threshold value, and when the advertisement content is output in the advertisement display region fixed at the bottom of the display 230, the number of times the user selects the advertisement content may be 0. In this case, it may be determined that the user relatively prefers the advertisement display region in the form of a pop-up window, and the processor 220 may determine the pop-up window form as the recommended attribute of the advertisement display region.

According to an embodiment, the processor 220 may adjust the attribute of the advertisement display region based on the determined recommended attribute and control the display 230 to output the advertisement content in the attribute-adjusted advertisement display region. As described above, when the pop-up window form is determined as the recommended attribute of the advertisement display region, the processor 220 may adjust the advertisement display region to the pop-up window form and control the display 230 to output the advertisement content in the adjusted advertisement display region.

According to an embodiment, the display 230 may output the advertisement content in the attribute-adjusted advertisement display region.

When the display 230 is implemented as a touch screen, the display 230 may be used as an input device in addition to an output device. For example, the display 230 may include at least one of a liquid crystal display (LCD), a thin film transistor liquid crystal display (TFT-LCD), an organic light-emitting diode (OLED) display, a flexible display, a three-dimensional (3D) display, and an electrophoretic display. Also, according to embodiments, the image display device 100a may include two or more displays 230.

Figure 3:
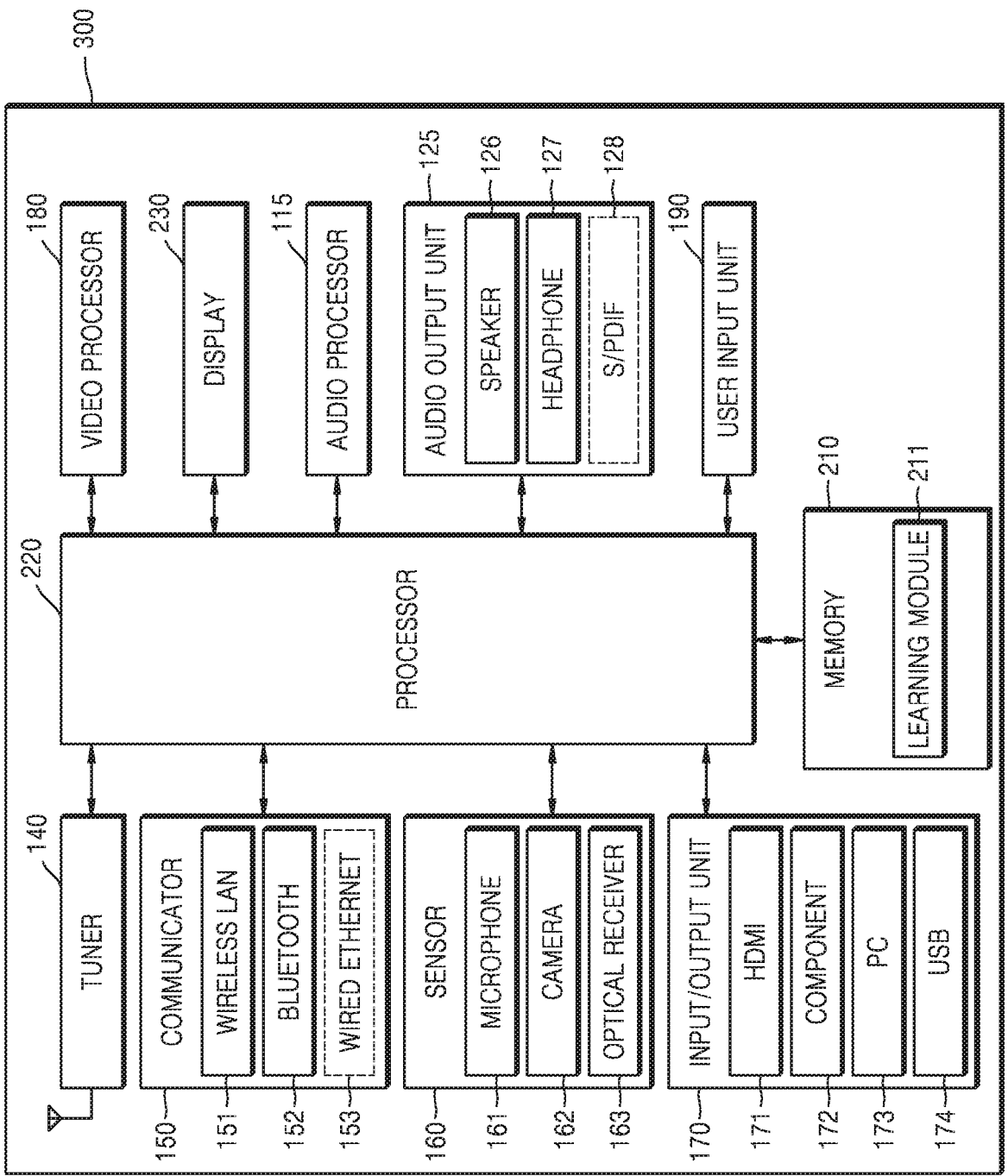
FIG. 3 is a block diagram illustrating a configuration of an image display device according to another embodiment.

FIG. 3 is a block diagram illustrating a configuration of an image display device according to another embodiment.

As illustrated in FIG. 3, an image display device 100b may further include a tuner 140, a communicator 150, a sensor 160, an input/output unit 170, a video processor 180, an audio processor 115, an audio output unit 125, and a user input unit 190, in addition to a memory 210, a processor 220, and a display 230.

As for the memory 210, the processor 220, and the display 230, the same descriptions as those in FIG. 2 will be omitted in FIG. 3.

The tuner 140 may process a broadcast signal, which is received by wire or wireless, through amplification, mixing, and/or resonance and may tune and select only the frequency of a channel, which is to be received by the image display device 100a, among a plurality of wave components. The broadcast signal may include audio, video, and additional information (e.g., electronic program guide (EPG)).

The broadcast signal received through the tuner 140 may be divided into audio, video, and/or additional information by decoding (e.g., audio decoding, video decoding, or additional information decoding). The audio, video, and/or additional information may be stored in the memory 210 under the control of the processor 220.

The tuner 140 of the image display device 100a may be singular or plural. The tuner 140 may be implemented as an all-in-one type with respect to the image display device 100a or may be implemented as a tuner (not illustrated) connected to the input/output unit 170 or a separate device (e.g., a set-top box) (not illustrated) including a tuner electrically connected to the image display device 100a.

The communicator 150 may connect the image display device 100b to an external device (e.g., an audio device) under the control of the processor 220. The processor 220 may transmit/receive content to/from the external device connected through the communicator 150, download an application from the external device, or perform Web browsing.

The communicator 150 may include any one of wireless Local Area Network (LAN) 151, Bluetooth 152, and wired Ethernet 153 corresponding to the structure and performance of the image display device 100*b*. Also, the communicator 150 may include any combination of the wireless LAN 151, the Bluetooth 152, and the wired Ethernet 153. The communicator 150 may receive a control signal of the control device 101 under the control of the processor 220. The control signal may be implemented as a Bluetooth type, a Radio Frequency (RF) signal type, or a WiFi type.

The communicator 150 may further include other short-range communications (e.g., Near Field Communication (NFC) (not illustrated) and Bluetooth Low Energy (BLE) (not illustrated)) in addition to Bluetooth.

According to an embodiment, the communicator 150 may receive a first trained model and a second trained model using one or more neural networks from an external server. Also, the communicator 150 may receive new virtual images at every preset period from an external server in order to update the virtual images stored in a database.

The sensor 160 may sense the user's voice, the user's image, or the user's interaction and may include a microphone 161, a camera 162, and an optical receiver 163.

The microphone 161 may receive the user's utterance voice. The microphone 161 may convert the received voice into an electrical signal and output the electrical signal to the processor 220.

The camera 162 may receive an image (e.g., consecutive frames) corresponding to the user's motion including a gesture within a camera recognition range.

The optical receiver 163 may receive an optical signal (including a control signal) received from the control device 101. The optical receiver 163 may receive an optical signal corresponding to a user input (e.g., touch, press, touch gesture, voice, or motion) from the control device 101. The control signal may be extracted from the received optical signal under the control of the processor 220.

According to an embodiment, the optical receiver 163 may receive, from the control device 101, an optical signal corresponding to a user input for changing the channel on the channel list displayed on the display 230, a user input for executing an application, a user input for searching for an EPG, or a user input for selecting the advertisement content output in the advertisement display region in order to check the detailed information thereof.

The input/output unit 170 may receive, for example, a video (e.g., moving image), an audio (e.g., voice or music), and additional information (e.g., EPG) from outside the image display device 100*b* under the control of the processor 220. The input/output unit 170 may include any one of an HDMI (High-Definition Multimedia Interface) port 171, a component jack 172, a PC port 173, and a USB (Universal Serial Bus) port 174. The input/output unit 170 may include any combination of the HDMI port 171, the component jack 172, the PC port 173, and the USB port 174.

According to an embodiment, the memory 210 may store one or more programs for processing and controlling the operations of the processor 220 and may store data that is input to the image display device 100*b* or output from the image display device 100*b*.

The programs stored in the memory 210 may include a plurality of modules according to their functions and may include, for example, a learning module 211.

According to an embodiment, the learning module 211 may include a first trained model that is determined by learning the correlation between the user's log data and the recommended time for outputting the advertisement content in response to the input of the user's log data to one or more neural networks. The first trained model may be received from an external server, and the received first trained model may be stored in the learning module 211.

Also, the learning module 211 may include a second trained model that is determined by learning the correlation between the user's log data and the recommended attribute of the advertisement display region in response to the input of the user's log data to one or more neural networks. Like the first trained module, the second trained model may be received from the external server and the received second trained model may be stored in the learning module 211.

The processor 220 may control an overall operation of the image display device 100*b* and a signal flow between the internal components of the image display device 100*b* and perform a data processing function. When there is a user's input or a preset stored condition is satisfied, the processor 220 may execute various applications and an operating system (OS) stored in the memory 210.

According to an embodiment, by executing one or more instructions stored in the memory 210, the processor 220 may determine whether it is a recommended time for outputting advertisement content, from a user's log data, based on a first trained model using one or more neural networks; determine a recommended attribute of an advertisement display region from the user's log data, based on a second trained model using one or more neural networks, when it is determined that it is the recommended time for outputting the advertisement content; and adjust an attribute of the advertisement display region based on the determined recommended attribute and output the advertisement content in the attribute-adjusted advertisement display region.

The video processor 180 may process image data to be displayed by the display 230 and perform various image processing operations such as decoding, rendering, scaling, noise filtering, frame rate conversion, and resolution conversion on the image data.

The display 230 may display the video included in the broadcast signal received through the tuner 140 under the control of the processor 220. Also, the display 230 may display the content (e.g., moving images or broadcast content) input through the input/output unit 170 or the communicator 150. The display 230 may output the image stored in the memory 210 under the control of the processor 220.

The audio processor 115 may perform processing on audio data. The audio processor 115 may perform various processings such as decoding, amplification, and noise filtering on the audio data.

Under control of the processor 220, the audio output unit 125 may output the audio included in the broadcast signal received through the tuner 140, the audio input through the communicator 150 or the input/output unit 170, or the audio stored in the memory 210. The audio output unit 125 may include at least one of a speaker 126, a headphone output port 127, and an S/PDIF (Sony/Philips Digital Interface) output port 128.

The user input unit 190 may be a unit through which the user inputs data for controlling the image display device 100*b*. For example, the user input unit 190 may include a key pad, a dome switch, a touch pad, a jog wheel, and/or a jog switch but is not limited thereto.

Also, the user input unit 190 may be a component of the control device 101 described above or a component of the image display device 100b.

According to an embodiment, the user input unit 190 may receive an input for selecting the advertisement content output in the advertisement display region. Also, the user input unit 190 may receive an input for changing the channel based on the EPG or the channel list displayed on the display 230. For example, when the user input unit 190 includes a key pad or a dome switch, the channel may be changed through an input for clicking or pressing a numeric key corresponding to a particular channel or an input for clicking or pressing a direction key on the channel list; however, the present disclosure is not limited thereto.

Meanwhile, the block diagrams of the image display devices 100a and 100b illustrated in FIGS. 2 and 3 are block diagrams for an embodiment. Each component of the block diagram may be integrated, added, or omitted according to the specifications of the image display devices 100a and 100b that are actually implemented. That is, when necessary, two or more components may be combined into one component, or one component may be divided into two or more components. Also, a function performed in each block is to describe embodiments, and a particular operation or device thereof is not intended to limit the scope of the present disclosure.

Figure 4A:
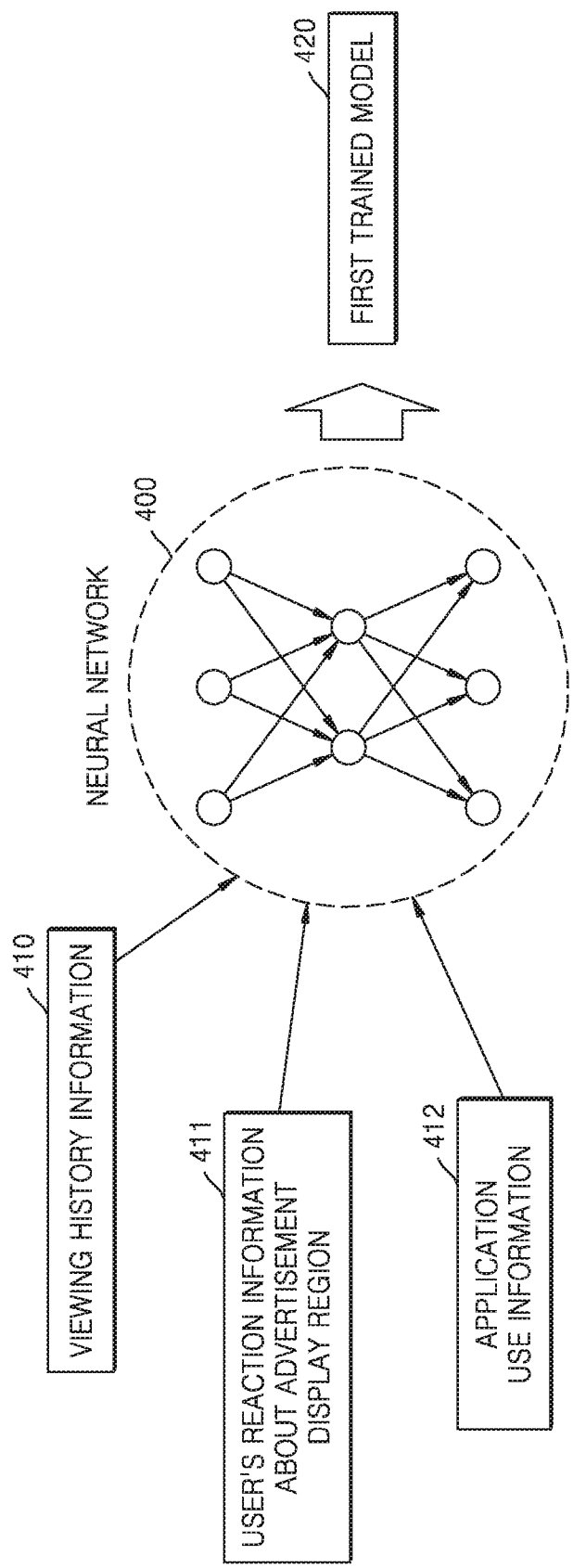
FIGS. 4A and 4B are diagrams illustrating an example of a neural network that learns a method of determining whether it is a recommended time for outputting advertisement content and a method of determining a recommended attribute of an advertisement display region, from a user's log data, according to an embodiment.
Figure 4B:
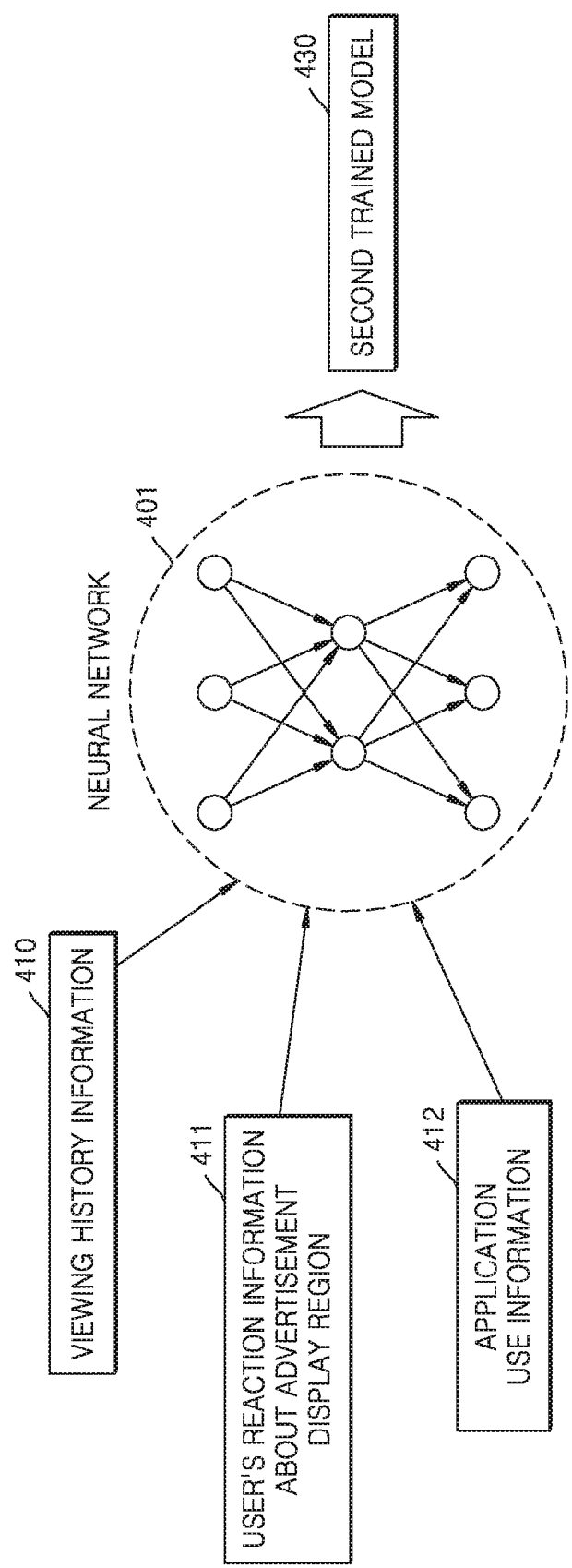

FIGS. 4A and 4B are diagrams illustrating an example of a neural network that learns a method of determining whether it is a recommended time for outputting advertisement content and a method of determining a recommended attribute of an advertisement display region, from a user's log data, according to an embodiment.

Referring to FIG. 4A, a neural network 400 may learn a method of determining whether it is a recommended time for outputting the advertisement content by using the user's log data as an input value. For example, the neural network 400 may learn a method of determining whether it is a recommended time for outputting the advertisement content, from the user's log data including viewing history information 410, the user's reaction information 411 about an advertisement display region, application use information 412, and event occurrence information 413 about the image display device 100. As described above, the viewing history information 410 may include information indicating the name of a broadcast channel viewed by the user, the title of broadcast content, and/or the viewing time thereof, and the user's reaction information 411 about the advertisement display region may include information indicating whether a user input for selecting the advertisement content is received and/or whether a user input for deactivating the advertisement display region is received when the advertisement content is output in the advertisement display region; however, the present disclosure is not limited thereto. Also, the application use information 412 may include information indicating the type of an application executed by the user, the use frequency of use of each application, the type of an application newly installed by the user, and/or the use time of an application; however, the present disclosure is not limited thereto. In response to the input of the user's log data including at least one of the viewing history information 410, the user's reaction information 411 about the advertisement display region, and the application use information 412, one or more neural networks may learn a method of determining whether it is a recommended time for outputting the advertisement content, and a first trained model 420 may be generated based on the learning result.

According to some embodiments, an operation of learning a method of determining whether it is a recommended time for outputting the advertisement content, from the user's log data by using one or more neural networks 400 may be performed in advance. Also, when some of the user's log data is changed, the first trained model 420 may be updated. For example, when the user frequently views broadcast content of a new category (e.g., religious broadcast) through the image display device 100 over a threshold level, changed viewing history information 410 may be used as training data.

Also, at every certain period, the user's log data indicating an event occurring in the image display device 100 in response to a user input may be stored in the memory 210 of the image display device 100, and the stored the user's log data may be input to one or more neural networks 400 at every certain period and then used as training data.

All of the user's log data may be input to one or more neural networks 400, and according to embodiments, log data satisfying a certain criterion among the user's log data may be selectively input to one or more neural networks 400. For example, among the user's log data, log data about an event the occurrence count of which is more than or equal to a threshold value may be filtered, and the filtered log data may be input to one or more neural networks 400 and then used as training data; however, the present disclosure is not limited thereto. When new training data is added, one or more neural networks 400 may re-learn a method of determining whether it is a recommended time for outputting the advertisement content, from the training data, and accordingly, the first trained model 420 may be updated.

Also, an operation of learning a method of determining whether it is a recommended time for outputting the advertisement content, from the user's log data, by using one or more neural networks 400 may be performed in the image display device 100 or may be performed in an external server according to embodiments. For example, an operation of learning a method of determining whether it is a recommended time for outputting the advertisement content, from the user's log data by using one or more neural networks 400 may require a relatively complex calculation. Accordingly, the external server may perform a learning operation and the image display device 100 may receive the first trained model 420 from the external server, thereby reducing the amount of calculation to be performed in the image display device 100. The image display device 100 may receive the first trained model 420 from the external server in advance, store the same in the memory, and determine whether it is a recommended time for outputting the advertisement content, from the user's log data, by using the stored first trained model 420.

Referring to FIG. 4B, the neural network 400 may learn a method of determining a recommended attribute of the advertisement content by using the user's log data as an input value.

In response to the input of the user's log data including at least one of the viewing history information 410, the user's reaction information 411 about the advertisement display region, and the application use information 412, one or more neural networks may learn a method of determining a recommended attribute of the advertisement content, and a second trained model 430 may be generated based on the learning result.

Also, according to an embodiment, one or more neural networks 400 may selectively use respective data necessary for learning to learn a method of determining whether it is a recommended time for outputting the advertisement content and to learn a method of determining a recommended attribute of the advertisement content, from the input user's log data. Thus, according to embodiments, different data may be used to learn a method of determining whether it is a recommended time for outputting the advertisement content and to learn a method of determining a recommended attribute of the advertisement content.

Figure 5:
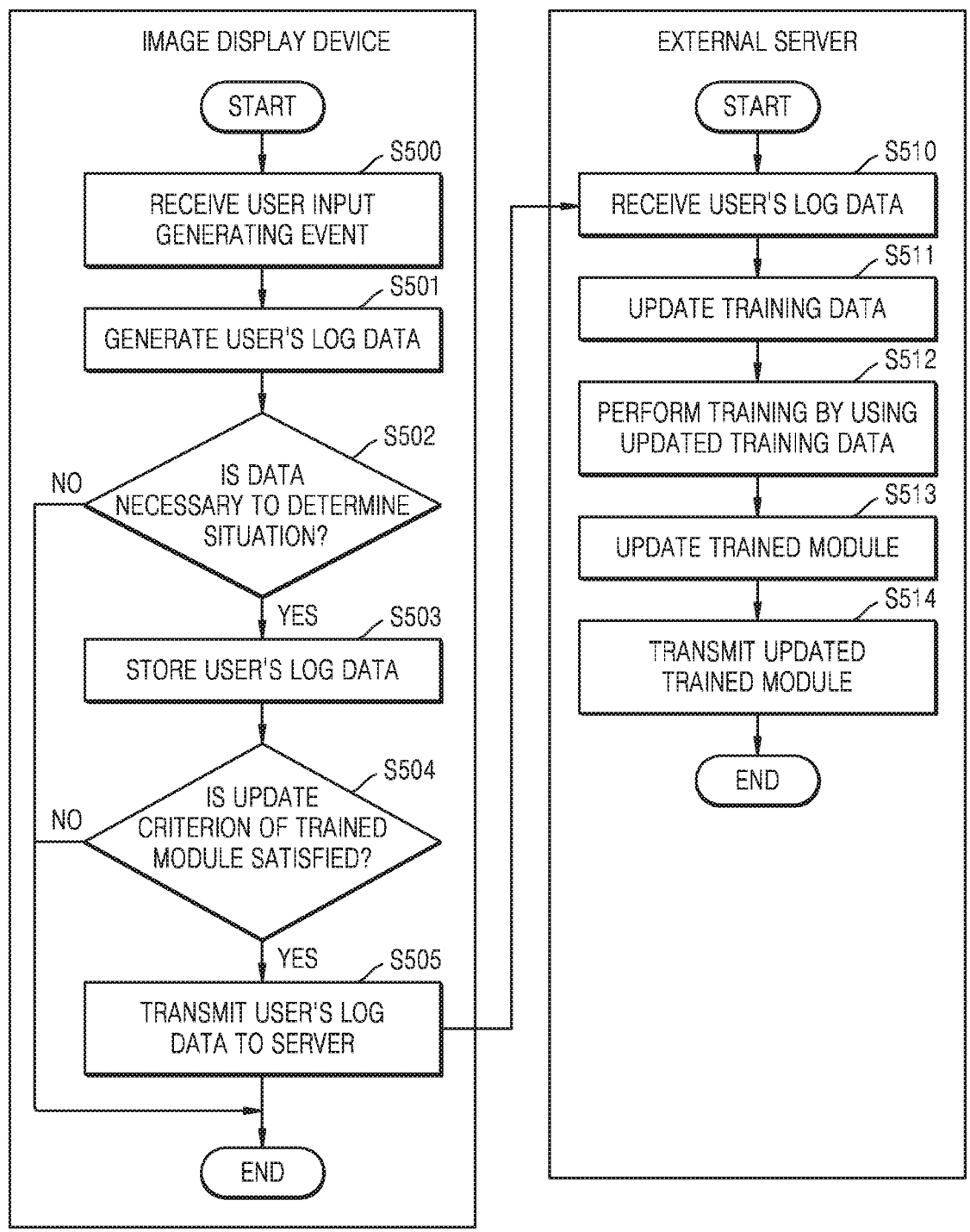
FIG. 5 is a flowchart illustrating a process of updating a trained model according to an embodiment.

FIG. 5 is a flowchart illustrating a process of updating a trained model according to an embodiment.

According to an embodiment, an operation of learning a method of determining whether it is a recommended time for outputting the advertisement content and determining a recommended attribute of the advertisement content, from the user's log data, by using one or more neural networks and an operation of updating the first trained model and the second trained model generated by the learning operation may be performed in the external server.

In operation S500, the image display device 100 according to an embodiment may receive an external input generating a certain event. The certain event may be an event occurring in the image display device 100 in response to a user input received from the control device 101. For example, the certain event may include, but is not limited to, an event of changing the channel, an event of executing an application through the image display device 100, an event of displaying an EPG, an event of selecting the advertisement content output in the advertisement display region, and an event of deactivating the advertisement display region.

In operation S501, the image display device 100 may generate user's log data in response to the received external input. For example, when an event of executing an application occurs, the image display device 100 may generate the user's log data including the name of the executed application, the category of the application, and the application use time; however, the present disclosure is not limited thereto.

In operation S502, the image display device 100 may determine whether the generated the user's log data is data necessary to determine a time for outputting the advertisement content or to determine a recommended attribute of the advertisement display region and may store the user's log data when it is determined that the user's log data is the necessary data (operation S503).

In operation S504, the image display device 100 may determine whether the stored user's log data satisfies a criterion for updating at least one of the first trained model and the second trained model that are prestored. For example, among the stored user's log data, log data about an event the occurrence count of which is more than or equal to a threshold value may be filtered, and the filtered log data may be used to update at least one of the first trained model and the second trained model. Accordingly, the first trained model and the second trained model may more accurately determine whether it is a time for outputting the advertisement content and a recommended attribute of the advertisement display region, from the more reliable user's log data.

In operation S505, the image display device 100 may transmit the stored user's log data to the external server when it is determined that the stored user's log data satisfies the criterion for updating at least one of the first trained model and the second trained model that are prestored.

In operation S510, the external server according to an embodiment may receive the user's log data from the image display device 100. Also, in operation S511, the external server may update a training data database (DB) by adding the received user's log data to the training data DB used for learning.

In operation S512, the external server may update at least one of the first trained model and the second trained model based on the updated training data DB. Also, in operation S514, the external server may transmit the updated trained model among the first trained model and the second trained model to the image display device 100.

Also, the external server according to an embodiment may perform the above update operation at every preset period, and the period may vary according to embodiments.

Figure 6A:
FIGS. 6A and 6B are diagrams illustrating an example in which an image display device outputs advertisement content by determining whether it is a recommended time for outputting the advertisement content, according to an embodiment.
Figure 6B:
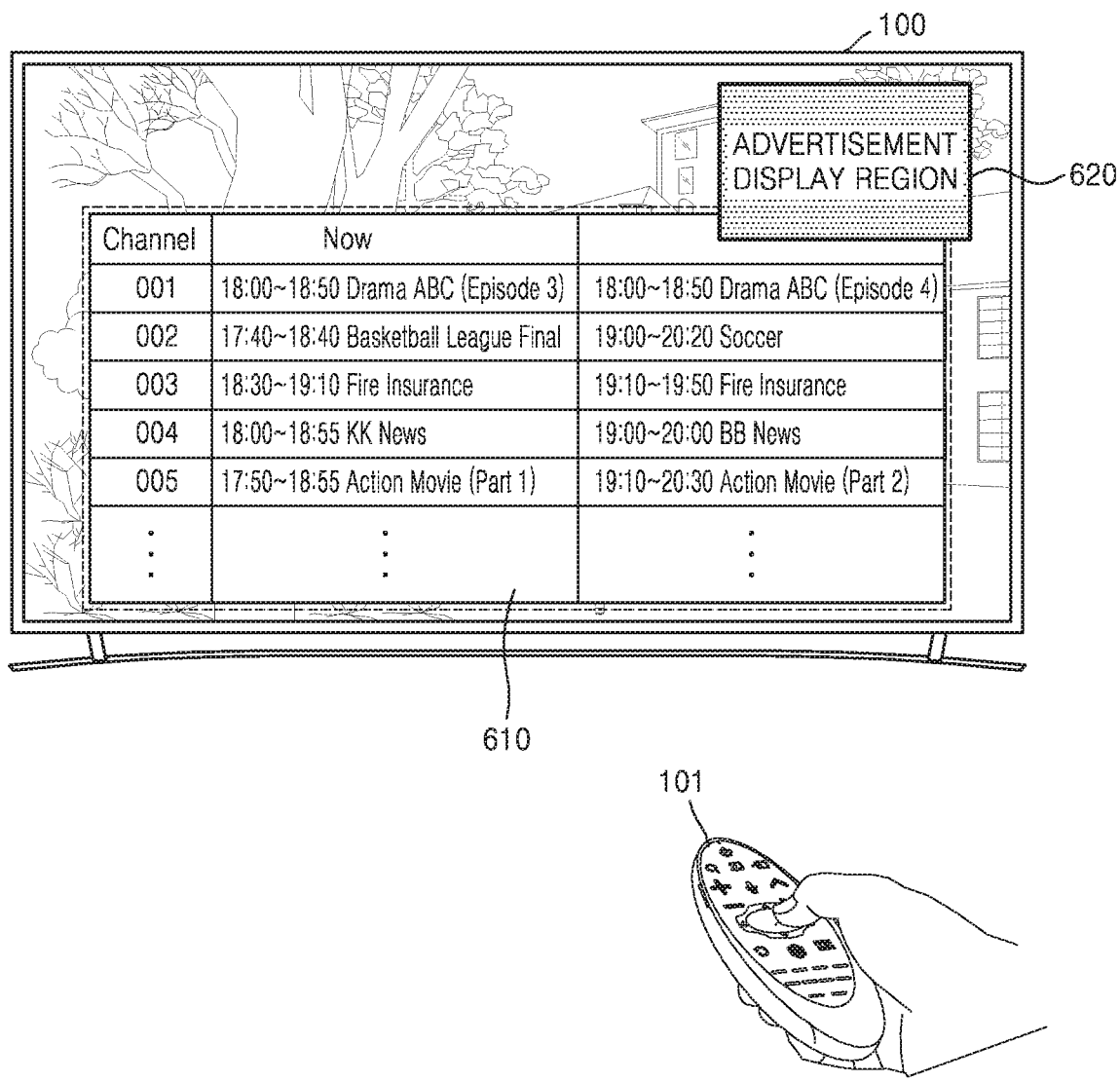

FIGS. 6A and 6B are diagrams illustrating an example in which an image display device outputs advertisement content by determining whether it is a recommended time for outputting the advertisement content, according to an embodiment.

According to an embodiment, the image display device 100 may determine whether it is a time for outputting the advertisement content, from the user's log data, based on the first trained model.

Referring to FIG. 6A, the image display device 100 may display a drama ABC, which is being broadcast, on the display 230. The image display device 100 may receive a user input requesting to display a list of executable applications from the control device 101 and display an application list 600 on the display 230 in response to the received user input. Also, the image display device 100 may receive, from the control device 101, a user input searching for executable applications in the application list 600. In this case, the event about the image display device may include an event of displaying the application list and an event of searching for executable applications in the application list.

The image display device 100 may determine whether the user is currently concentrating on viewing the drama ABC, from the user's log data, based on the first trained model. For example, in the case of a first user who frequently views the drama ABC, even when an event of searching for applications irrelevant to the drama ABC occurs, the image display device 100 may determine that the first user is concentrating on the drama ABC. However, when an event of searching for an application is generated by a second user who frequently views a golf channel while the drama ABC is being output, the image display device 100 may determine that the second user is not concentrating on viewing the drama ABC. Also, even in the case of the first user who frequently views the drama ABC, when an event of searching for applications occurs continuously for a preset time or more, the image display device 100 may determine that the first user is not concentrating on viewing the drama ABC. The log data of each user (e.g., the log data of the first user or the log data of the second user) may include information about channels frequently viewed by each user, frequently-viewed programs, viewing times, whether an event of searching for an application has occurred, and/or the number of times an event of searching for an application has occurred. Accordingly, based on the log data of each user, even when the same event occurs, the image display device 100 may differently determine a recommended time for outputting the advertisement content.

Referring to FIG. 6A, based on the first trained model, when it is determined that the user is concentrating on viewing the drama ABC, the image display device 100 may determine that it is not a recommended time for outputting the advertisement content. Also, the image display device 100 may not activate the advertisement display region that is a region in which the advertisement content is output. Accordingly, the image display device 100 may allow the user to concentrate more on viewing the drama ABC.

Unlike this, referring to FIG. 6B, the image display device 100 may display an EPG 610 on the display 230 in response to a user input requesting the EPG 610. When an event of searching for a channel in the EPG 610 occurs continuously, the image display device 100 may determine that the user is not concentrating on viewing the currently-output broadcast content. When it is determined that the user is not concentrating on viewing the broadcast content being output, the image display device 100 may determine that it is a recommended time for outputting the advertisement content.

According to an embodiment, the image display device 100 may obtain information indicating a recommended attribute of the advertisement display region, from the user's log data, based on the second trained model. As described above, the preferred size, position, and form of the advertisement display region and the form of the advertisement content output in the advertisement display region may vary according to users. For example, a first user may prefer the advertisement display region located at the upper right on the display 230, and a second user may prefer the advertisement display region in the form of a pop-up window. Also, as another example, a third user may prefer the advertisement content in the form of an animation, and a fourth user may prefer the advertisement content in the form of a text.

According to an embodiment, the image display device 100 may determine which attribute of advertisement display region is preferred by the user, based on the second trained model determined by learning the correlation between the user's log data and the recommended attribute of the advertisement display region. For example, as illustrated in FIG. 6B, the user may prefer an advertisement display region 620 located at the upper right on the display 230. For example, when the advertisement content is displayed in the advertisement display region 620 located at the upper right on the display 230, when the frequency of selecting the advertisement content to check detailed information or viewing the advertisement content to the end is higher than that in the case where the advertisement content is displayed in the advertisement display region having a different attribute, it may be determined that the user prefers the advertisement display region 620 located at the upper right on the display 230.

As another example, when the probability of the user viewing the advertisement content in an animation form to the end is higher than that in the case where the advertisement content in a different form is output, it may be determined that the user prefers the advertisement content in an animation form. In this case, the image display device 100 may output the advertisement content in an animation form, thereby allowing the user to be more interested in the advertisement content.

Figure 7A:
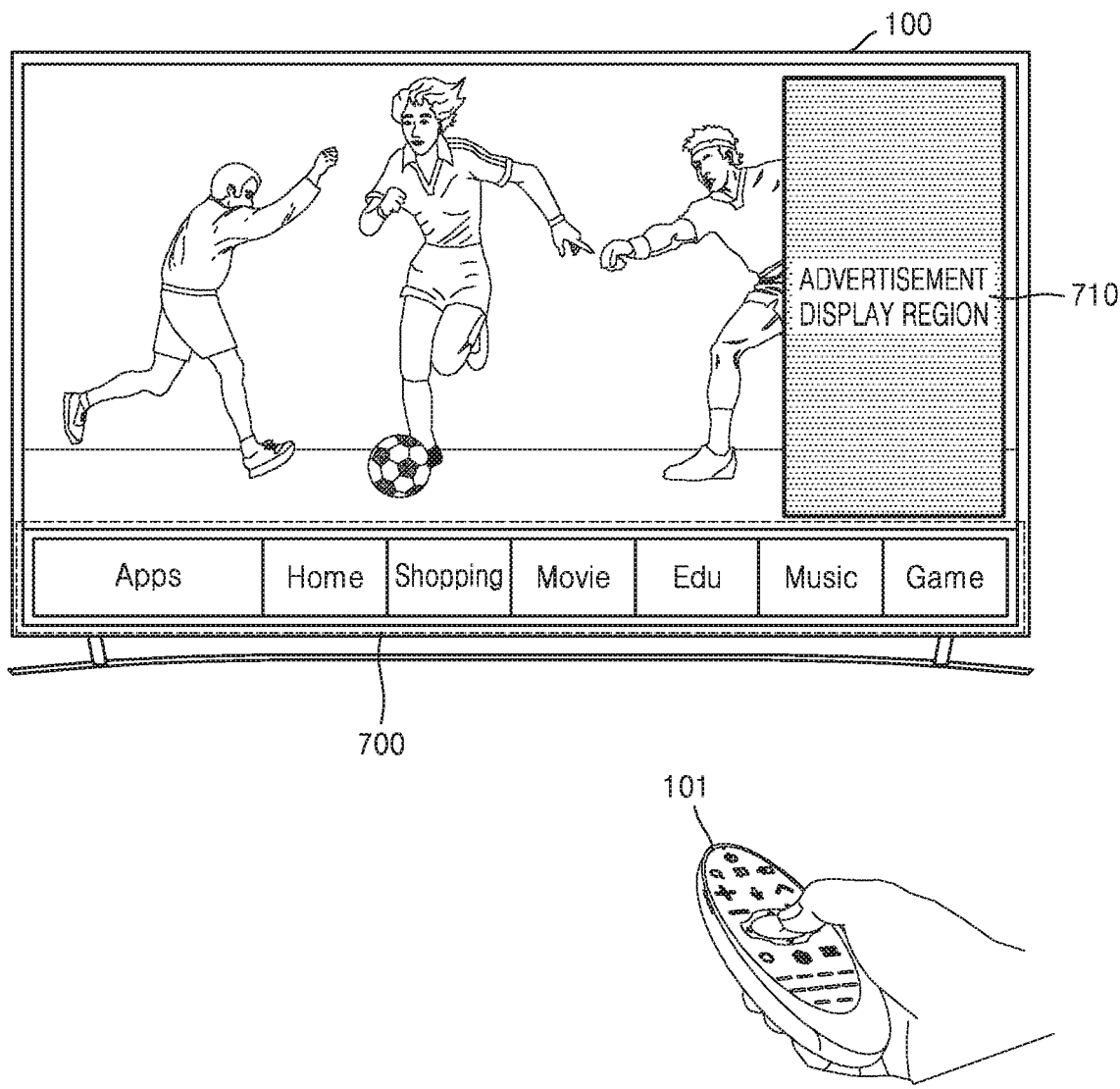
FIGS. 7A and 7B are diagrams illustrating an example in which an image display device stops outputting advertisement content, according to an embodiment.
Figure 7B:
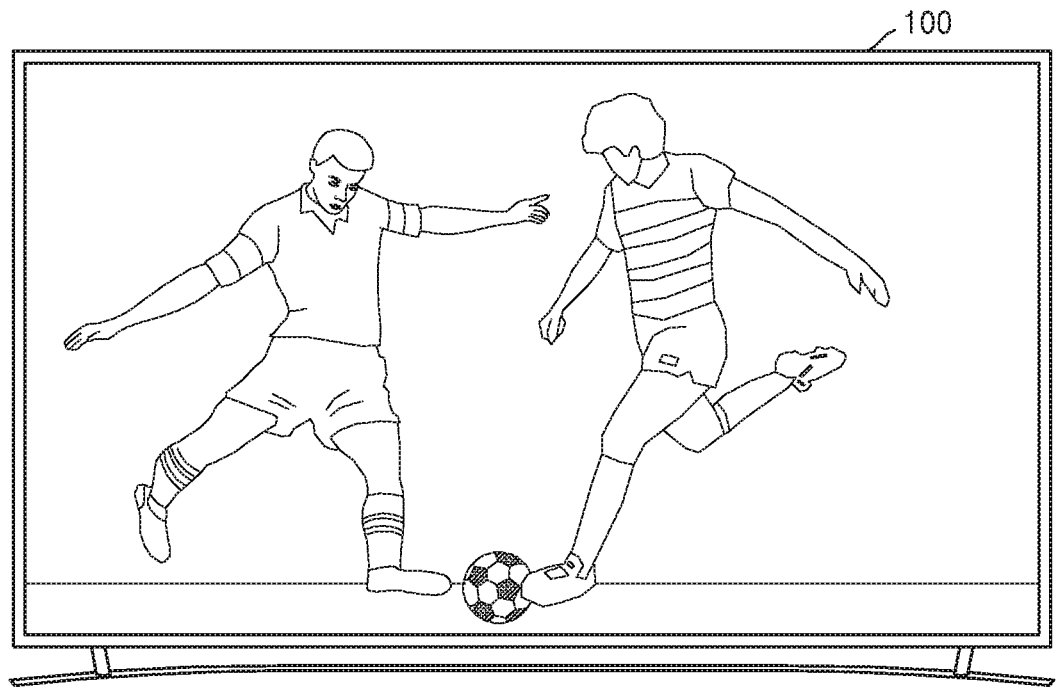
Figure 7B:
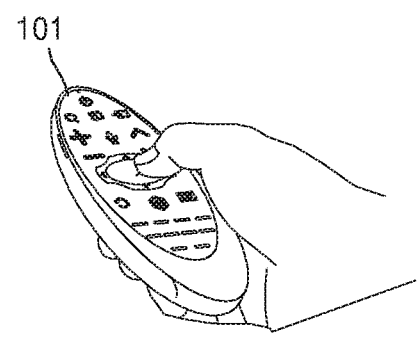

FIGS. 7A and 7B are diagrams illustrating an example in which an image display device stops outputting advertisement content, according to an embodiment.

According to an embodiment, when the advertisement content is being output in the advertisement display region, the image display device 100 may stop outputting the advertisement content when it is determined that it is not a recommended time for outputting the advertisement content.

For example, referring to FIG. 7A, the image display device 100 may be relaying a soccer game on the display 230. In this case, the image display device 100 may display an application list 700 indicating executable applications in a partial region of the display 230 in response to a user input requesting the application list 700. When a user input searching for applications in the application list 700 is received from the control device 101, the image display device 100 may determine whether it is a recommended time for outputting the advertisement content, based on the first trained model.

When it is determined that it is a recommended time for outputting the advertisement content, the image display device 100 may determine a recommended attribute of the advertisement display region based on the second trained model. For example, as illustrated in FIG. 7A, based on the second trained model, the image display device 100 may determine that the user prefers an advertisement display region 710 which is located at the right side of the display 230 and the transparency of which is set. In this case, the recommended attribute of the advertisement display region 710 may be information indicating the advertisement display region which is located at the right side of the display 230 and the transparency of which is set. The image display device 100 may adjust the attribute of the advertisement display region based on the determined recommended attribute and output the advertisement content in the attribute-adjusted advertisement display region.

However, when the advertisement content is being output, the image display device 100 may deactivate the application list 700 or may not display the application list 700 on the display 230 any more in response to a certain user input. In this case, the image display device 100 may determine whether it is no longer a recommended time for outputting the advertisement content, based on the first trained model.

For example, as illustrated in FIG. 7A, immediately after the soccer game starts, the user may not concentrate on viewing the soccer game and a user input searching for applications may be received. Accordingly, the image display device 100 may determine that it is a recommended time for outputting the advertisement content and output the advertisement content in the advertisement display region.

However, as illustrated in FIG. 7B, as the soccer game progresses, the user may concentrate on viewing the soccer game and a user input requesting to deactivate the application list 700 or to no longer output the same may be received. In this case, the image display device 100 may determine whether it is no longer a recommended time for outputting the advertisement content, based on the first trained model. The image display device 100 may determine that the user is concentrating on the soccer game and stop outputting the advertisement content, thereby allowing the user to concentrate more on viewing the soccer game.

Figure 8A:
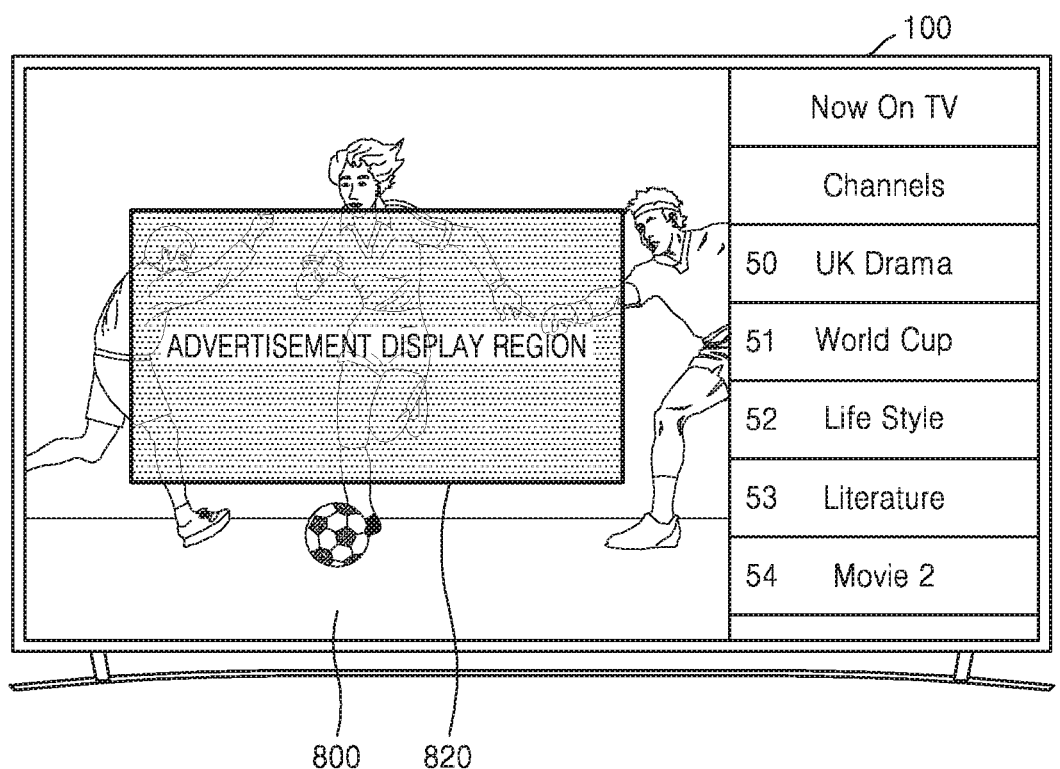
FIGS. 8A and 8B are diagrams illustrating an example in which an image display device differently sets an attribute of an advertisement display region, according to an embodiment.
Figure 8A:
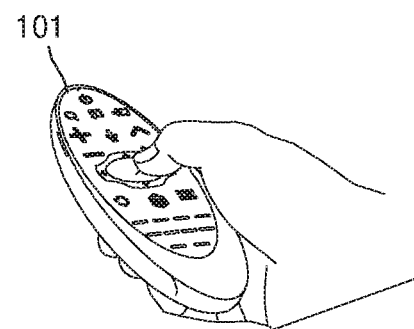
Figure 8B:
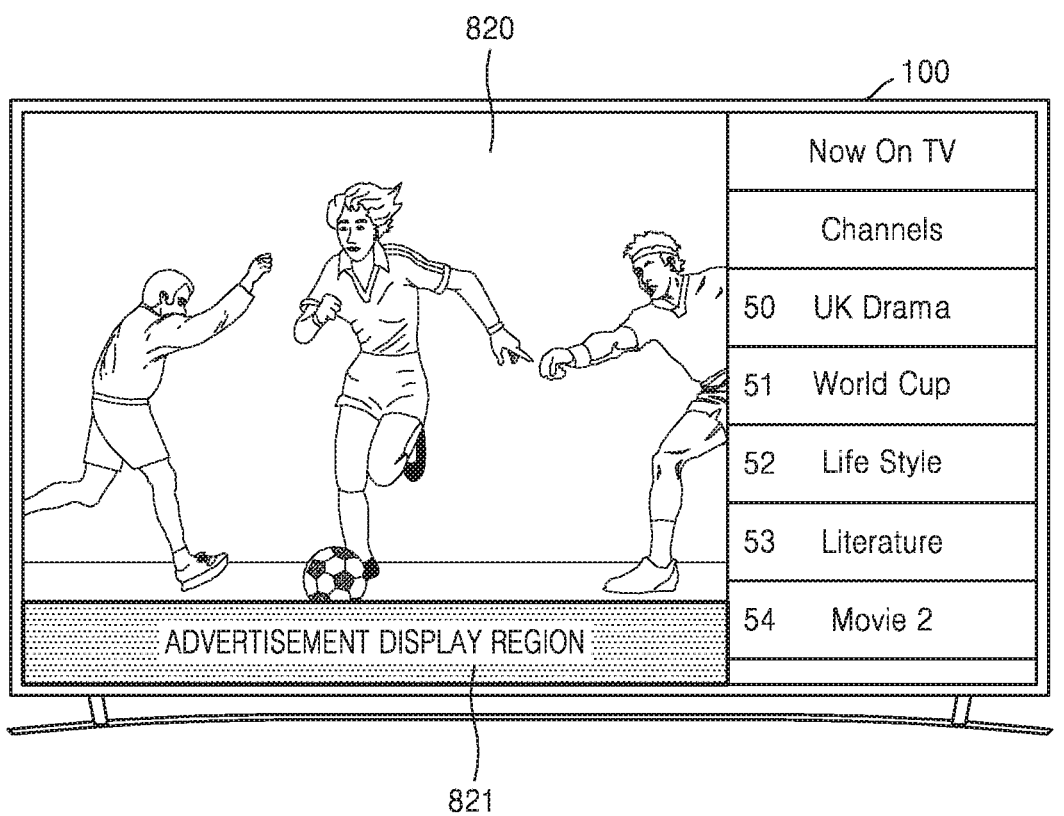
Figure 8B:
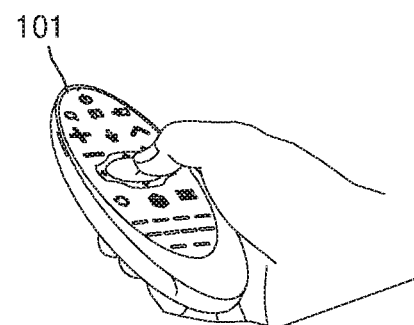

FIGS. 8A and 8B are diagrams illustrating an example in which an image display device differently determines an attribute of an advertisement display region, according to an embodiment.

As described above, users may prefer advertisement display regions having different attributes. Thus, the image display device 100 may determine a recommended attribute indicating an attribute preferred by the user, adjust the attribute of the advertisement display region based on the recommended attribute, and output the advertisement content in the attribute-adjusted advertisement display region.

Referring to FIG. 8A, the image display device 100 may display an advertisement display region 820 in the form of a pop-up window on the display 230 based on the recommended attribute of the advertisement display region. Also, the image display device 100 may adjust the transparency of the advertisement display region 820 such that the user may view the advertisement content displayed in the advertisement display region 820 together with the broadcast content (e.g., soccer game relay broadcast) 800 that is currently being output.

Also, referring to FIG. 8B, the image display device 100 may display an advertisement display region 821 located at the bottom of the display 230, based on the recommended attribute of the advertisement display region 821. For example, when the advertisement display region 821 is located at the bottom of the display 230, the frequency of the user viewing the advertisement content to the end or selecting the advertisement content to check detailed information may be relatively high. Information about whether the user has viewed the advertisement content to the end or has selected the advertisement content to check detailed information may be stored in the user's log data.

Figure 9:
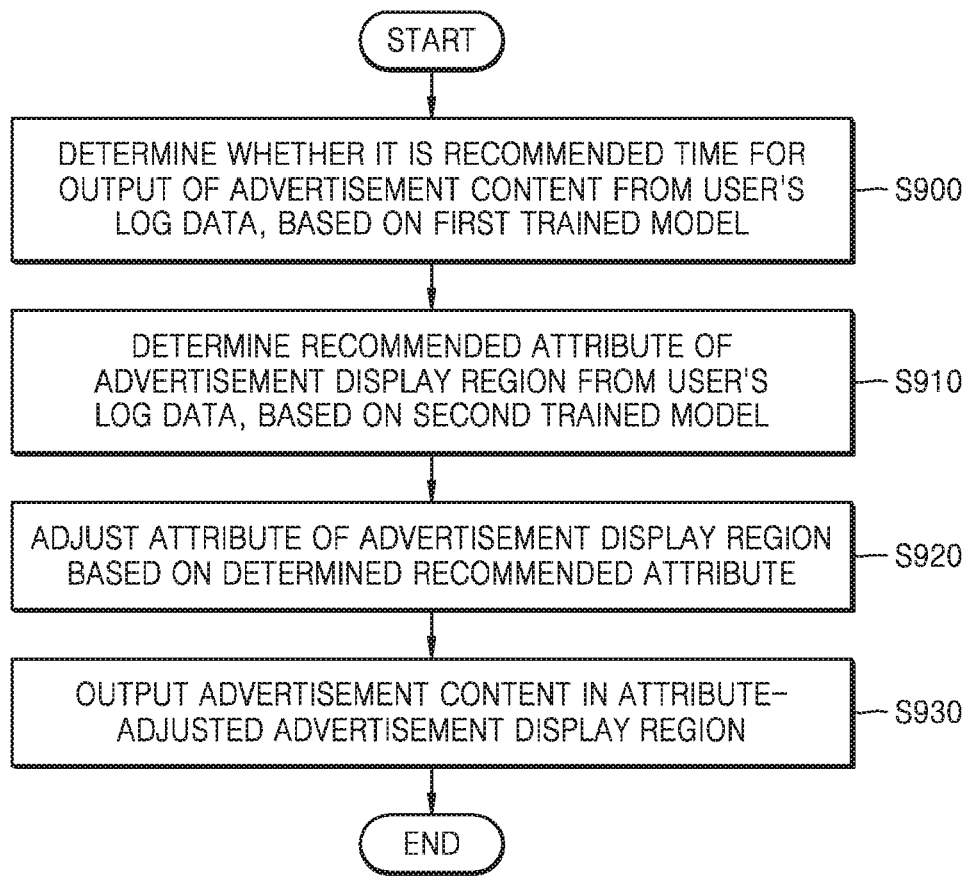
FIG. 9 is a flowchart illustrating an operation method of an image display device according to an embodiment.

FIG. 9 is a flowchart illustrating an operation method of an image display device according to an embodiment.

In operation S900, the image display device 100 may determine whether it is a recommended time for outputting the advertisement content, from the user's log data, based on the first trained model using one or more neural networks.

The user's log data may include at least one of the user's viewing history information, the user's reaction information about the advertisement display region, and application use information but is not limited thereto. The user's viewing history information may include, for example, at least one of channels viewed by the user through the image display device 100, program names, viewing times, information indicating whether a channel zapping event has occurred, and information indicating whether an electronic program guide (EPG) has been entered. The user's reaction information about the advertisement display region may include, but is not limited to, at least one of information indicating whether the user has viewed the advertisement content output in the advertisement display region from start to end, information indicating whether the user has deactivated the advertisement display region in which the advertisement content is output, a proportion of the user viewing time in the total play time of the advertisement content, and information indicating whether the user has selected the advertisement content to check the detailed information of the advertisement content.

According to an embodiment, when a channel zapping event for changing the channel has occurred, the image display device 100 may differently determine whether it is a recommended time for outputting the advertisement content, based on the user's log data. For example, when the currently-output broadcast content is a soccer game, a user frequently viewing soccer games may have a higher concentration on the soccer game than a user frequently viewing dramas. Thus, even when a user frequently viewing soccer games generates a channel zapping event while viewing a soccer game, the processor 220 may determine that it is not a recommended time for outputting advertisement content. However, when a user frequently viewing dramas generates a channel zapping event while viewing a soccer game, the image display device 100 may determine that the user is not concentrating on viewing the soccer game and determine that it is a recommended time for outputting the advertisement content.

The result of determining whether it is the recommended time for outputting the advertisement content based on the first trained model may be in the form of, for example, "YES" or "NO" or may be in the form of dividing the recommendation degree thereof into a plurality of levels and mapping a certain value to each of the levels. For example, the recommendation degree may be represented in the form of a percentage, and the higher recommendation degree may be mapped to the greater value.

In operation S910, when it is determined that it is a recommended time for outputting the advertisement content, the image display device 100 may determine a recommended attribute of the advertisement display region from the user's log data, based on the second trained model using one or more neural networks.

As described above, the attribute of the advertisement display region may include at least one of the position, size, or form of the advertisement display region and the form of the advertisement content output in the advertisement display region. The image display device 100 may determine the attribute of the advertisement display region preferred by the user, from the user's log data.

In operation S920, the image display device 100 may adjust the attribute of the advertisement display region based on the determined recommended attribute and in operation S930, the image display device 100 may output the advertisement content in the attribute-adjusted advertisement display region. As described above, when the pop-up window form is determined as the recommended attribute of the advertisement display region, the image display device 100 may adjust the advertisement display region to the pop-up window form and output the advertisement content in the adjusted advertisement display region.

According to an embodiment, when the advertisement content is being output in the advertisement display region, the image display device 100 may deactivate the advertisement display region and stop outputting the advertisement content when it is determined that it is not a recommended time for outputting the advertisement content.

Figure 10:
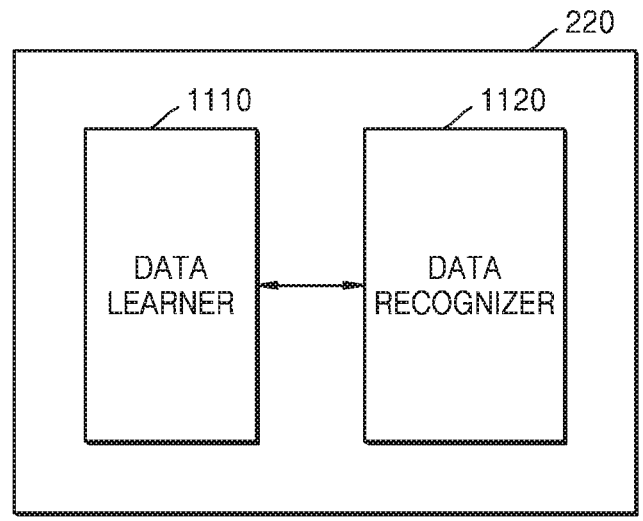
FIG. 10 is a block diagram illustrating a configuration of a processor according to an embodiment.

FIG. 10 is a block diagram illustrating a configuration of a processor according to an embodiment.

Referring to FIG. 10, the processor 220 according to an embodiment may include a data learner 1110 and a data recognizer 1120.

The data learner 1110 may learn a criterion for determining whether it is a recommended time for outputting the advertisement content, from the user's log data, and determining a recommended time of the advertisement display region. The data learner 1110 may learn a criterion about which information of the user's log data is used to determine whether it is a recommended time for outputting the advertisement content, from the user's log data, and determine a recommended time of the advertisement display region. Also, the data learner 1110 may learn a criterion about how to determine whether it is a recommended time for outputting the advertisement content, by using the user's log data, and a criterion about how to determine a recommended time of the advertisement display region. By obtaining data to be used for learning and applying the obtained data to a data recognition model described below, the data learner 1110 may learn a criterion for determining whether it is a recommended time for outputting the advertisement content and determining a recommended time of the advertisement display region.

The data recognizer 1120 may determine whether it is a recommended time for outputting the advertisement content, from the user's log data, determine a recommended attribute of the advertisement display region, and output the determination results. By using the trained data recognition model, the data recognizer 1120 may determine whether it is a recommended time for outputting the advertisement content, from the user's log data, and determine a recommended attribute of the advertisement display region. The data recognizer 1120 may obtain user's log data according to a criterion preset by learning and may use the data recognition model by using the obtained user's log data as an input value. Also, by using the data recognition model, the data recognizer 1120 may determine whether it is a recommended time for outputting the advertisement content, from the user's log data, and determine a recommended attribute of the advertisement display region. Also, a result value output by the data recognition model by using the obtained user's log data as an input value may be used to update the data recognition model.

At least one of the data learner 1110 and the data recognizer 1120 may be manufactured in the form of at least one hardware chip and mounted on the electronic device. For example, at least one of the data learner 1110 and the data recognizer 1120 may be manufactured in the form of a dedicated hardware chip for artificial intelligence (AI) or may be manufactured as a portion of a general-purpose processor (e.g., a CPU or an application processor) or a graphic processor (e.g., a GPU) and mounted on various electronic devices described above.

In this case, the data learner 1110 and the data recognizer 1120 may be mounted on one electronic device or on respective separate electronic devices. For example, one of the data learner 1110 and the data recognizer 1120 may be included in the image display device 100, and the other may be included in the server. Also, by wired or wireless communication, the data learner 1110 and the data recognizer 1120 may provide the model information constructed by the data learner 1110 to the data recognizer 1120, and the data input to the data recognizer 1120 may be provided as additional training data to the data learner 1110.

Meanwhile, at least one of the data learner 1110 and the data recognizer 1120 may be implemented as a software module. When at least one of the data learner 1110 and the data recognizer 1120 is implemented as a software module (or a program module including instructions), the software module may be stored in a non-transitory computer-readable recording medium. Also, in this case, at least one software module may be provided by an operating system (OS) or by a certain application. Alternatively, some of the at least one software module may be provided by an OS, and the others may be provided by a certain application.

Figure 11:
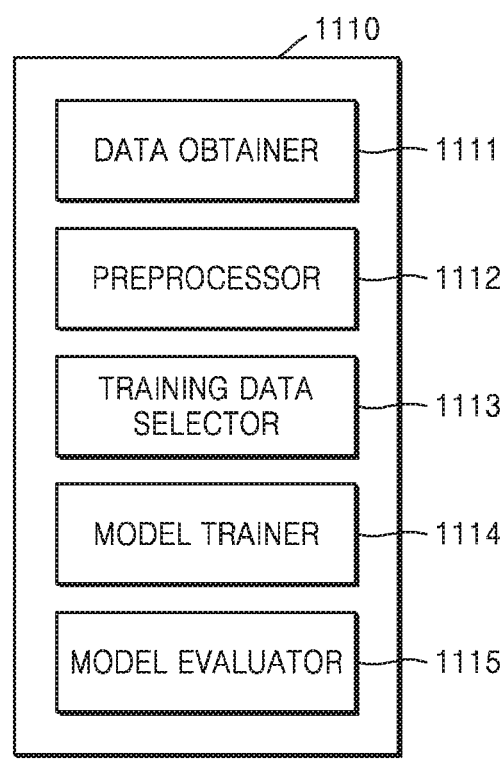
FIG. 11 is a block diagram illustrating a configuration of a data learner according to an embodiment.

FIG. 11 is a block diagram of a data learner according to an embodiment.

Referring to FIG. 11, the data learner 1110 according to an embodiment may include a data obtainer 1111, a preprocessor 1112, a training data selector 1113, a model trainer 1114, and a model evaluator 1115.

The data obtainer 1111 may obtain data necessary for training for determining whether it is a recommended time for outputting the advertisement content, from the user's log data, and determining a recommended attribute of the advertisement display region. The data obtainer 1111 may obtain data from an external server such as a social network server, a cloud server, or a content providing server.

The data obtainer 1111 may obtain user's log data necessary for training for determining whether it is a recommended time for outputting the advertisement content and determining a recommended attribute of the advertisement display region. For example, the data obtainer 1111 may obtain the user's log data when a certain event occurs in the image display device 100 in response to a user input received through the control device 101.

The preprocessor 1112 may preprocess the obtained data such that the data may be used for training for determining whether it is a recommended time for outputting the advertisement content, from the user's log data, and determining a recommended attribute of the advertisement display region. The preprocessor 1112 may process the obtained data into a preset format such that the model trainer 114 described below may use the obtained data for training for determining whether it is a recommended time for outputting the advertisement content, from the user's log data, and determining a recommended attribute of the advertisement display region. For example, the preprocessor 1112 may analyze the obtained user's log data to detect the attribute information of each log data; however, the present disclosure is not limited thereto.

The training data selector 1113 may select data necessary for training among the preprocessed data. The selected data may be provided to the model trainer 1114. The training data selector 1113 may select data necessary for training among the preprocessed data according to a preset criterion for determining whether it is a recommended time for outputting the advertisement content, from the user's log data, and determining a recommended attribute of the advertisement display region. Also, the training data selector 1113 may select data according to a criterion preset by learning by the model trainer 1114 described below.

The model trainer 1114 may learn a criterion about which training data is to be used to determine whether it is a recommended time for outputting the advertisement content, from the user's log data, and determine a recommended attribute of the advertisement display region. For example, the model trainer 1114 may learn the type, number, or level of information constituting the user's log data used to determine whether it is a recommended time for outputting the advertisement content, from the user's log data, and determine a recommended attribute of the advertisement display region.

Also, the model trainer 1114 may use the training data to train the data recognition model used to determine whether it is a recommended time for outputting the advertisement content, from the user's log data, and determine a recommended attribute of the advertisement display region. In this case, the data recognition model may be a pre-constructed model. For example, the data recognition model may be a model pre-constructed by receiving basic training data.

The data recognition model may be constructed considering the application field of the recognition model, the purpose of learning, or the computer performance of the device. The data recognition model may be, for example, a model based on a neural network. For example, a model such as a deep neural network (DNN), a recurrent neural network (RNN), or a bidirectional recurrent deep neural network (BRDNN) may be used as the data recognition model; however, the present disclosure is not limited thereto.

According to various embodiments, when there are a plurality of pre-constructed data recognition models, the model trainer 1114 may determine a data recognition model having a high relationship between input training data and basic training data as a data recognition model to be trained. In this case, the basic training data may be pre-classified for each type of data, and the data recognition model may be pre-constructed for each type of data. For example, the basic training data may be pre-classified by various criteria such as the region where the training data is generated, the time when the training data is generated, the size of the training data, the genre of the training data, the generator of the training data, and the type of an object in the training data.

Also, the model trainer 1114 may train the data recognition model by using, for example, a training algorithm including error back-propagation or gradient descent.

Also, the model trainer 1114 may train the data recognition model, for example, through supervised learning using training data as an input value. Also, the model trainer 1114 may train the data recognition model, for example, unsupervised learning for finding a criterion for determining the user's state by learning the type of data necessary to determine the user's state without particular supervision by itself. Also, the model trainer 1114 may train the data recognition model, for example, through reinforcement learning using feedback on whether the result of determining the user's state according to learning is correct.

Also, when the data recognition model is trained, the model trainer 1114 may store the trained data recognition model. In this case, the model trainer 1114 may store the trained data recognition model in the memory of the device including the data recognizer 1120. Alternatively, the model trainer 1114 may store the trained data recognition model in the memory of the device including the data recognizer 1120 described below. Alternatively, the model trainer 1114 may store the trained data recognition model in the memory of the server connected to the electronic device through a wired or wireless network.

In this case, the memory in which the trained data recognition model is stored may also store, for example, instructions or data related to at least one other component of the device. Also, the memory may store software and/or programs. The program may include, for example, a kernel, middleware, an application programming interface (API), and/or an application program (or "application").

The model evaluator 1115 may input evaluation data into the data recognition model and may cause the model trainer 1114 to learn when the recognition result output from the evaluation data does not satisfy a certain criterion. In this case, the evaluation data may be preset data for evaluating the data recognition model.

For example, the model evaluator 1115 may evaluate that the certain criterion is not satisfied, when the number or ratio of evaluation data with inaccurate recognition results among the recognition results of the trained data recognition model about the evaluation data exceeds a preset threshold value. For example, when the certain criterion is defined as a ratio of 2%, the model evaluator 1115 may evaluate that the trained data recognition model is not suitable, when the trained data recognition model outputs incorrect recognition results with respect to more than 20 evaluation data among a total of 1,000 evaluation data.

Meanwhile, when there are a plurality of trained data recognition models, the model evaluator 1115 may evaluate whether each of the trained data recognition models satisfies a certain criterion and determine the model satisfying the certain criterion as a final data recognition model. In this case, when there are a plurality of models satisfying the certain criterion, the model evaluator 1115 may determine, as a final data recognition model, any one model or a certain number of models preset in descending order of evaluation scores.

Meanwhile, at least one of the data obtainer 1111, the preprocessor 1112, the training data selector 1113, the model trainer 1114, and the model evaluator 1115 in the data learner 1110 may be manufactured in the form of at least one hardware chip and mounted on the electronic device. For example, at least one of the data obtainer 1111, the preprocessor 1112, the training data selector 1113, the model trainer 1114, and the model evaluator 1115 may be manufactured in the form of a dedicated hardware chip for artificial intelligence (AI) or may be manufactured as a portion of a general-purpose processor (e.g., a CPU or an application processor) or a graphic processor (e.g., a GPU) and mounted on various electronic devices described above.

Also, the data obtainer 1111, the preprocessor 1112, the training data selector 1113, the model trainer 1114, and the model evaluator 1115 may be mounted on one electronic device or may be respectively mounted on separate electronic devices. For example, some of the data obtainer 1111, the preprocessor 1112, the training data selector 1113, the model trainer 1114, and the model evaluator 1115 may be included in the electronic device, and the others may be included in the server.

Also, at least one of the data obtainer 1111, the preprocessor 1112, the training data selector 1113, the model trainer 1114, and the model evaluator 1115 may be implemented as a software module. When at least one of the data obtainer 1111, the preprocessor 1112, the training data selector 1113, the model trainer 1114, and the model evaluator 1115 is implemented as a software module (or a program module including instructions), the software module may be stored in a non-transitory computer-readable recording medium. Also, in this case, at least one software module may be provided by an operating system (OS) or by a certain application. Alternatively, some of the at least one software module may be provided by an OS, and the others may be provided by a certain application.

Figure 12:
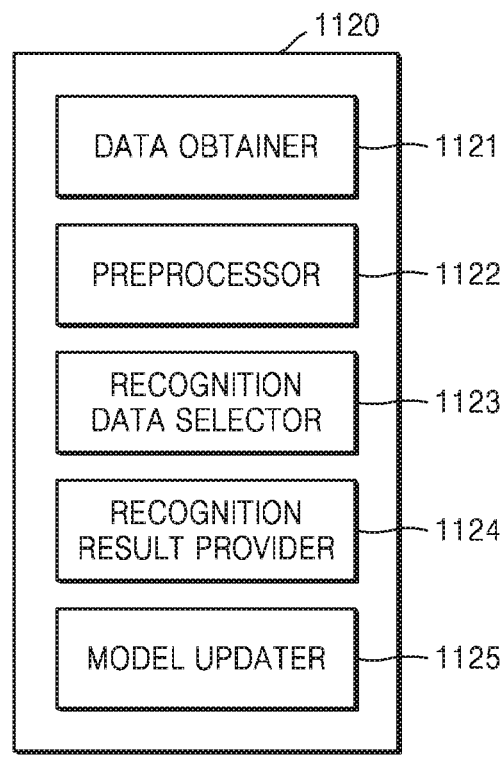
FIG. 12 is a block diagram illustrating a configuration of a data recognizer according to an embodiment.

FIG. 12 is a block diagram illustrating a configuration of a data recognizer according to an embodiment.

Referring to FIG. 12, the data recognizer 1120 according to some embodiments may include a data obtainer 1121, a preprocessor 1122, a recognition data selector 1123, a recognition result provider 1124, and a model updater 1125.

The data obtainer 1121 may obtain data necessary to determine whether it is a recommended time for outputting the advertisement content, from the user's log data, and determine a recommended attribute of the advertisement display region, and the preprocessor 1122 may preprocess the obtained data such that the obtained data may be used to determine whether it is a recommended time for outputting the advertisement content, from the user's log data, and determine a recommended attribute of the advertisement display region. The preprocessor 1122 may process the obtained data into a preset format such that the recognition result provider 1124 described below may use the obtained data to determine whether it is a recommended time for outputting the advertisement content, from the user's log data, and determine a recommended attribute of the advertisement display region.

The recognition data selector 1123 may select, among the preprocessed data, data necessary to determine whether it is a recommended time for outputting the advertisement content, from the user's log data, and determine a recommended attribute of the advertisement display region. The selected data may be provided to the recognition result provider 1124. The recognition data selector 1123 may select some or all of the preprocessed data according to a preset criterion for determining whether it is a recommended time for outputting the advertisement content, from the user's log data, and determining a recommended attribute of the advertisement display region.

Also, by applying the selected data to the data recognition model, the recognition result provider 1124 may determine whether it is a recommended time for outputting the advertisement content, from the user's log data, and determine a recommended attribute of the advertisement display region. The recognition result provider 1124 may provide the recognition result according to the purpose of recognizing data. The recognition result provider 1124 may apply the selected data to the data recognition model by using the data selected by the recognition data selector 1123 as an input value. Also, the recognition result may be determined by the data recognition model.

The recognition result provider 1124 may provide identification information indicating the recommended attribute of the advertisement display region and information indicating whether it is a recommended time for outputting the advertisement content, which are determined from the user's log data.

The model updater 1125 may allow the data recognition model to be updated based on the evaluation of the recognition result provided by the recognition result provider 1124. For example, the model updater 1125 may allow the model trainer 1114 to update the data recognition model, by providing the model trainer 1114 with the recognition result provided by the recognition result provider 1124.

Meanwhile, at least one of the data obtainer 1121, the preprocessor 1122, the recognition data selector 1123, the recognition result provider 1124, and the model updater 1125 in the data recognizer 1120 may be manufactured in the form of at least one hardware chip and mounted on the electronic device. For example, at least one of the data obtainer 1121, the preprocessor 1122, the recognition data selector 1123, the recognition result provider 1124, and the model updater 1125 may be manufactured in the form of a dedicated hardware chip for artificial intelligence (AI) or may be manufactured as a portion of a general-purpose processor (e.g., a CPU or an application processor) or a graphic processor (e.g., a GPU) and mounted on various electronic devices described above.

Also, the data obtainer 1121, the preprocessor 1122, the recognition data selector 1123, the recognition result provider 1124, and the model updater 1125 may be mounted on one electronic device or may be respectively mounted on separate electronic devices. For example, some of the data obtainer 1121, the preprocessor 1122, the recognition data selector 1123, the recognition result provider 1124, and the model updater 1125 may be included in the image display device 100, and the others may be included in the server.

Also, at least one of the data obtainer 1121, the preprocessor 1122, the recognition data selector 1123, the recognition result provider 1124, and the model updater 1125 may be implemented as a software module. When at least one of the data obtainer 1121, the preprocessor 1122, the recognition data selector 1123, the recognition result provider 1124, and the model updater 1125 is implemented as a software module (or a program module including instructions), the software module may be stored in a non-transitory computer-readable recording medium. Also, in this case, at least one software module may be provided by an operating system (OS) or by a certain application. Alternatively, some of the at least one software module may be provided by an OS, and the others may be provided by a certain application.

Figure 13:
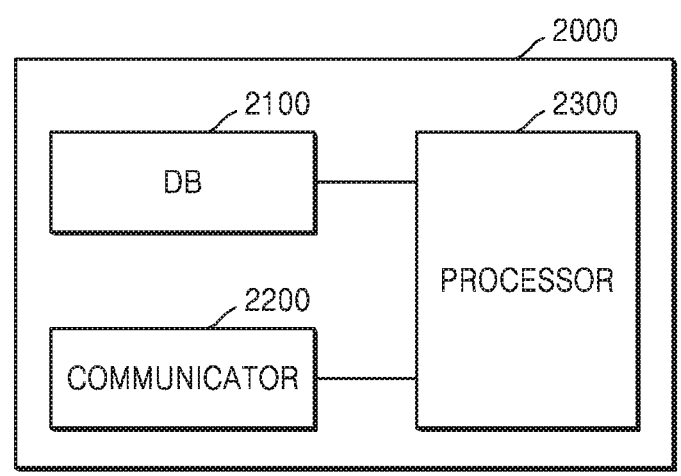
FIG. 13 is a block diagram illustrating a configuration of a server according to an embodiment.

FIG. 13 is a block diagram illustrating a configuration of a server according to an embodiment.

Referring to FIG. 13, a server 2000 according to an embodiment may include a DB 2100, a communicator 2200, and a processor 2300.

The DB 2100 may store log data indicating an event occurring in the image display device 100 in response to a user input.

The communicator 2200 may include one or more components for allowing communication with the image display device 100.

In general, the processor 2300 may control an overall operation of the server 2000. For example, the processor 2300 may control the overall operations of the DB 2100 and the communicator 2200 by executing the programs stored in the DB 2100 of the server 2000. By executing the programs stored in the DB 2100, the processor 2300 may perform some of the functions of the image display device 100 illustrated in FIGS. 1 to 12.

The processor 2300 may perform a function of determining whether it is a recommended time for outputting the advertisement content, from the user's log data, and determining a recommended attribute of the advertisement display region, which is a function performed by the image display device 100 in FIGS. 1 to 12.

Figure 14:
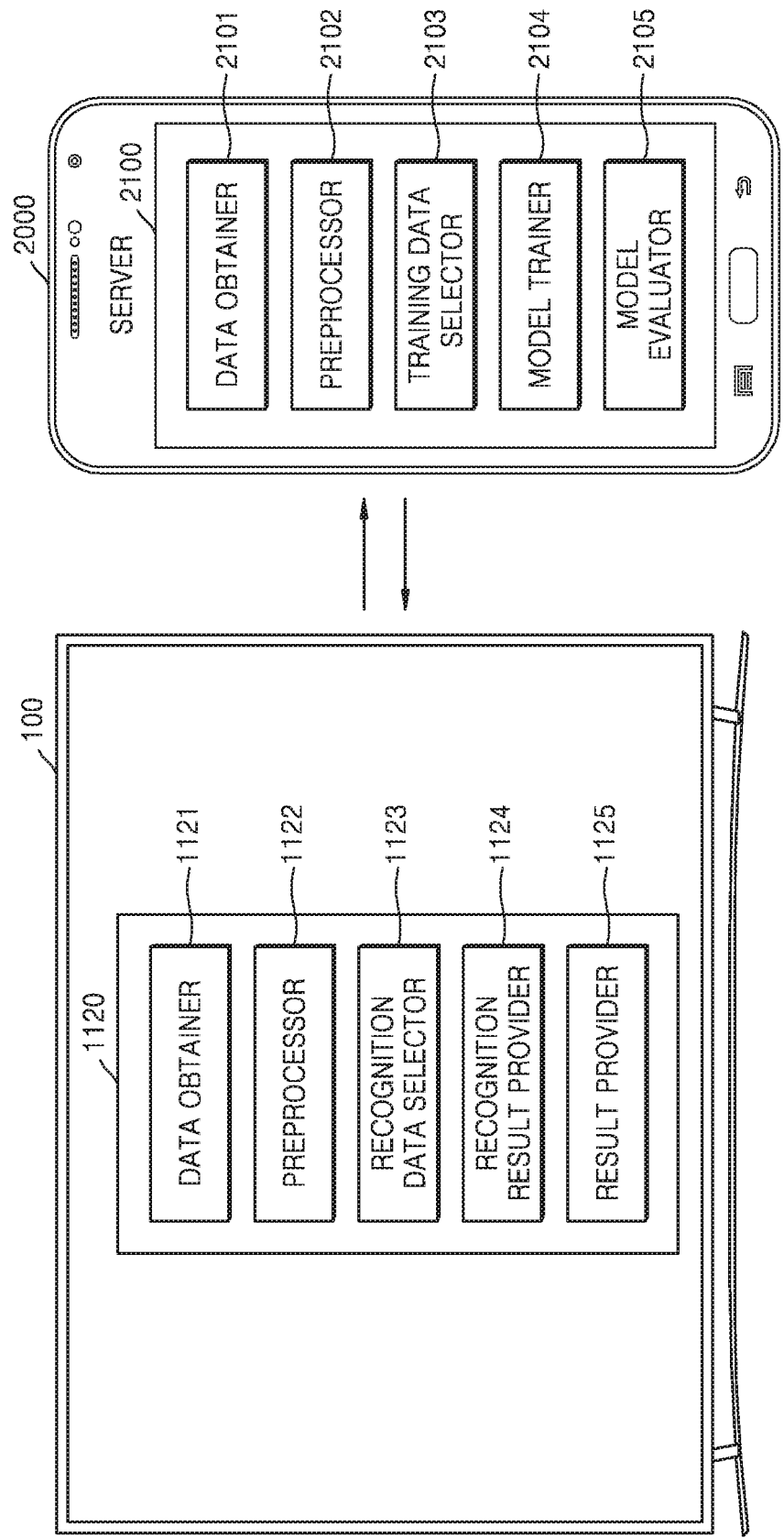
FIG. 14 is a diagram illustrating an example in which an image display device and a server learn and recognize data by interworking with each other, according to an embodiment.

FIG. 14 is a diagram illustrating an example in which an image display device and a server learn and recognize data by interworking with each other, according to an embodiment.

Referring to FIG. 14, the server 2000 may learn a criterion for determining whether it is a recommended time for outputting the advertisement content, from the user's log data, and determining a recommended attribute of the advertisement display region. By obtaining data to be used for training and applying the obtained data to the data recognition model, the server 2000 may learn a criterion for determining whether it is a recommended time for outputting the advertisement content, from the user's log data, and determining a recommended attribute of the advertisement display region.

In this case, a data obtainer 2101, a preprocessor 2102, a training data selector 2103, a model trainer 2104, and a model evaluator 2105 of the server 2000 may perform the function of the data learner 1110 illustrated in FIG. 11. The model trainer 2104 of the server 2000 may learn a criterion about which data is to be used to determine whether it is a recommended time for outputting the advertisement content, from the user's log data, and determine a recommended attribute of the advertisement display region. Also, the model trainer 2104 of the server 2000 may learn a criterion about how to determine whether it is a recommended time for outputting the advertisement content, from the user's log data, and how to determine a recommended attribute of the advertisement display region by using the data. By obtaining data to be used for training and applying the obtained data to the data recognition model, the model trainer 2104 may learn a criterion for determining whether it is a recommended time for outputting the advertisement content, from the user's log data, and determining a recommended attribute of the advertisement display region.

Also, by applying the data selected by the recognition data selector 1123 to the data recognition model generated by the server 2000, the recognition result provider 1124 of the image display device 100 may determined whether it is a recommended time for outputting the advertisement content, from the user's log data, and determine a recommended attribute of the advertisement display region. For example, the recognition result provider 1124 may transmit the data selected by the recognition data selector 1123 to the server 2000, to request the server 2000 to apply the data selected by the recognition data selector 1123 to the data recognition model to determined whether it is a recommended time for outputting the advertisement content, from the user's log data, and determine a recommended attribute of the advertisement display region.

Alternatively, the recognition result provider 1124 of the image display device 100 may receive the recognition model generated by the server 2000 from the server 2000 and use the received recognition model to determine whether it is a recommended time for outputting the advertisement content, from the user's log data, and determine a recommended attribute of the advertisement display region. Also, by applying the data selected by the recognition data selector 1123 to the data recognition model received from the server 2000, the recognition result provider 1124 of the image display device 100 may determined whether it is a recommended time for outputting the advertisement content, from the user's log data, and determine a recommended attribute of the advertisement display region.

Also, the image display device 100 and the server 2000 may effectively distribute and perform operations for data recognition and training of the data recognition model and thus may efficiently perform data processing to provide a service according to the user's intention and may effectively protect the user's privacy.

Some embodiments may also be implemented in the form of a computer-readable recording medium including instructions executable by a computer, such as program modules executed by a computer. The computer-readable recording medium may be any available medium accessible by a computer and may include all of volatile or non-volatile mediums and removable or non-removable mediums. Also, the computer-readable recording medium may include all of computer storage mediums and communication mediums. The computer storage mediums may include all of volatile or non-volatile mediums and removable or non-removable mediums that are implemented by any method or technology to store information such as computer-readable instructions, data structures, program modules, or other data. For example, the communication mediums may include any information transmission medium and may include other transmission mechanisms or other data of modulated data signals such as carriers, computer-readable instructions, data structures, or program modules.

Also, herein, a "unit" may include a hardware component such as a processor or a circuit, and/or a software component executed by a hardware component such as a processor.

The foregoing is illustrative of embodiments of the present disclosure, and those of ordinary skill in the art will readily understand that various modifications may be made therein without materially departing from the spirits or features of the present disclosure. Therefore, it is to be understood that the embodiments described above should be considered in a descriptive sense only and not for purposes of limitation. For example, elements described as being combined may also be implemented in a distributed manner, and elements described as being distributed may also be implemented in a combined manner.

Therefore, the scope of the present disclosure is defined not by the detailed description of the embodiments but by the following claims, and all changes or modifications derived from the meaning and scope of the following claims and equivalent concepts thereof should be construed as being included in the scope of the present disclosure.

The invention claimed is:

1. An image display device comprising:
a display;
a memory storing one or more instructions; and
a processor configured to execute the one or more instructions to:
determine whether a first time while broadcast content is being output through the display is a recommended time for outputting advertisement content, from a user's log data, using a first trained model;
determine a recommended attribute of a region of the display on which an advertisement is displayed from the user's log data, using a second trained model, based on a determination that the first time is the recommended time for outputting the advertisement content; and
adjust an attribute of the region of the display on which the advertisement is displayed based on the determined recommended attribute and control the display to output the advertisement content in the attribute-adjusted region of the display on which the advertisement is displayed,
wherein the first trained model is generated based on learning results of a correlation between the user's log data and the recommended time for outputting the advertisement content using one or more neural networks, and
the second trained model is generated based on learning results of a correlation between the user's log data and the recommended attribute of the advertisement display region using the one or more neural networks.

2. The image display device of claim 1, wherein the attribute of the region of the display on which the advertisement is displayed comprises at least one of a position, a size, or a form of the advertisement display region and a form of the advertisement content output in the advertisement display region.

3. The image display device of claim 1, wherein the user's log data comprises at least one of viewing history information, reaction information of the user about the advertisement display region, and application use information.

4. The image display device of claim 3, wherein the viewing history information comprises at least one of channels viewed by the user, program names, viewing times, information indicating occurrence of a channel zapping event, and information indicating occurrence of an event related to an electronic program guide (EPG),
the reaction information of the user about the advertisement display region comprising at least one of whether the advertisement content output in the advertisement display region has been viewed, a proportion of a viewed portion in the advertisement content, and information indicating whether an external input for selecting the advertisement display region has been received, and
the application use information includes at least one of a name of an application used, an application use time, a category of an application used, and an application use frequency.

5. The image display device of claim 1, wherein the processor is further configured to determine whether the first time is the recommended time for outputting the advertisement content, in response to a user input generating one of a channel zapping event, an electronic program guide (EPG) search event, and an application execution event.

6. The image display device of claim 1, wherein the processor is further configured to stop outputting the advertisement content based on a determination that the first time is not the recommended time for outputting the advertisement content.

7. The image display device of claim 6, wherein the processor is further configured to deactivate the advertisement display region based on the determination that the first time is not the recommended time for outputting the advertisement content.

8. The image display device of claim 1, wherein the recommended time for outputting the advertisement content is determined according to a user's concentration on broadcast content that is being output through the display.

9. The image display device of claim 1, wherein the processor is further configured to:
- generate, in response to a user input generating an event about the image display device, log data corresponding to the generated event; and
- update at least one of the first trained model and the second trained model when the generated log data is input to the one or more neural networks.

10. An image display method comprising:
- determining whether a first time while broadcast content is being output through a display is a recommended time for outputting advertisement content, from a user's log data, using a first trained model;
- determining a recommended attribute of a region of a display in which an advertisement is displayed from the user's log data, using a second trained model, based on a determination that the first time is the recommended time for outputting the advertisement content; and
- adjusting an attribute of the region of the display on which the advertisement is displayed based on the determined recommended attribute and outputting the advertisement content in the attribute-adjusted region of the display in which the advertisement is displayed,
- wherein the first trained model is generated based on learning results of a correlation between the user's log data and the recommended time for outputting the advertisement content using one or more neural networks, and
- the second trained model is generated based on learning results of a correlation between the user's log data and the recommended attribute of the advertisement display region using the one or more neural networks.

11. The image display method of claim 10, wherein the attribute of the region of the display in which the advertisement is displayed comprises at least one of a location, a size, or a form of the advertisement display region and a form of the advertisement content output in the advertisement display region.

12. The image display method of claim 10, wherein the use log data comprises at least one of viewing history information, reaction information of the user about the advertisement display region, and application use information.

13. The image display method of claim 12, wherein the viewing history information comprises at least one of channels viewed by the user, program names, viewing times, information indicating occurrence of a channel zapping event, and information indicating occurrence of an event related to an electronic program guide (EPG),
- the reaction information of the user about the advertisement display region comprises at least one of whether the advertisement content output in the advertisement display region has been viewed, a proportion of a viewed portion in the advertisement content, and information indicating whether an external input for selecting the advertisement display region has been received, and
- the application use information includes at least one of a name of an application used, an application use time, a category of an application used, and an application use frequency.

14. A non-transitory computer-readable recording medium having recorded thereon a program for implementing the image display method of claim 10.

* * * * *